(12) United States Patent
Chen Larsson et al.

(10) Patent No.: US 12,526,752 B1
(45) Date of Patent: Jan. 13, 2026

(54) WIRELESS COMMUNICATIONS DEVICE USING TWO USIMs

(71) Applicant: TELEFONAKTIEBOLAGET LM ERICSSON (PUBL), Stockholm (SE)

(72) Inventors: Maomao Chen Larsson, Lund (SE); Christian Bergljung, Lund (SE); Rongyan Lin, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/254,205

(22) Filed: Jun. 30, 2025

Related U.S. Application Data

(63) Continuation of application No. PCT/EP2025/067556, filed on Jun. 23, 2025.

(60) Provisional application No. 63/752,186, filed on Jan. 31, 2025.

(51) Int. Cl.
| | |
|---|---|
| *H04W 4/00* | (2018.01) |
| *H04W 8/20* | (2009.01) |
| *H04W 52/36* | (2009.01) |
| H04W 84/04 | (2009.01) |

(52) U.S. Cl.
CPC .......... *H04W 52/365* (2013.01); *H04W 8/20* (2013.01); *H04W 52/367* (2013.01); *H04W 84/042* (2013.01)

(58) Field of Classification Search
CPC ... H04W 52/365; H04W 8/20; H04W 52/367; H04W 84/042
See application file for complete search history.

(56) References Cited

U.S. PATENT DOCUMENTS

| | | | |
|---|---|---|---|
| 9,775,082 B1 * | 9/2017 | Chakraborty | ....... H04W 52/365 |
| 2022/0295422 A1 * | 9/2022 | Wang | .................. H04W 52/365 |
| 2023/0180148 A1 | 6/2023 | Kung et al. | |

OTHER PUBLICATIONS

"3rd Generation Partnership Project; Technical Specification Group Radio Access Network; NR; Physical layer procedures for control (Release 18)", Technical Specification, 3GPP TS 38.213 V18.5.0 (Dec. 2024), 313 Pages.

"3rd Generation Partnership Project; Technical Specification Group Radio Access Network; NR; Medium Access Control (MAC) protocol specification (Release 18)", Technical Specification, 3GPP TS 38.321 V18.4.0 (Dec. 2024), 338 Pages.

(Continued)

*Primary Examiner* — Omoniyi Obayanju
(74) *Attorney, Agent, or Firm* — Ericsson Inc.

(57) ABSTRACT

A method implemented by a wireless communications device utilizing at least two Universal Subscriber Identity Modules, USIMs, and at least two uplink transmitters, UL Tx, and configured to communicate with a first public mobile network, PLMN, and a second PLMN is provided. The method includes transmitting first data to the first PLMN using a first USIM and the at least two UL Tx. The method further includes transmitting a first power headroom report, PHR, to the first PLMN. The method further includes transmitting second data to the second PLMN using a second USIM and one of the at least two UL Tx. The method further includes in response to using the second USIM and the one of the at least two UL Tx to transmit the second data to the second PLMN, transmitting a second PHR to the first PLMN without waiting for an active PHR configuration timer to expire.

27 Claims, 8 Drawing Sheets

(56) References Cited

OTHER PUBLICATIONS

"3rd Generation Partnership Project; Technical Specification Group Radio Access Network; NR; Physical layer procedures for control (Release 18)", Technical Specification, Technical Specification, 313 Pages.

"3rd Generation Partnership Project; Technical Specification Group Radio Access Network; NR; Physical layer procedures for data (Release 18)", Technical Specification, 3GPP TS 38.214 V18.5.0 (Dec. 2024), 300 Pages.

"3rd Generation Partnership Project; Technical Specification Group Radio Access Network; NR; Radio Resource Control (RRC) protocol specification (Release 18)", Technical Specification, 3GPP TS 38.331 V18.4.0 (Dec. 2024), 1702 Pages.

"3rd Generation Partnership Project; Technical Specification Group Radio Access Network; NR; User Equipment (UE) radio transmission and reception; Part 1: Range 1 Standalone (Release 18)", Technical Specification, 3GPP TS 38.101-1 V18.8.0 (Dec. 2024), 872 Pages.

"3rd Generation Partnership Project; Technical Specification Group Radio Access Network; NR; User Equipment (UE) radio transmission and reception; Part 2: Range 2 Standalone (Release 18)", Technical Specification, 3GPP TS 38.101-2 V18.8.0 (Dec. 2024), 235 Pages.

"3rd Generation Partnership Project; Technical Specification Group Radio Access Network; NR; User Equipment (UE) radio transmission and reception; Part 3: Range 1 and Range 2 Interworking operation with other radios (Release 18)", Technical Specification, 3GPP TS 38.101-3 V18.8.0 (Dec. 2024), 13 Pages.

GSMA, "Requirements for Multi SIM Devices", Version 4.0, GSM Association, Official Document TS.37—Requirements for Multi SIM Devices, Version 4.0, Jun. 14, 2018, 62 Pages.

Vivo, "Revised WID: Dual Transmission/Reception (Tx/Rx) Multi-SIM for NR", 3GPP TSG RAN Meeting #95e, RP-220955, (revision of RP-213584), Mar. 17-23, 2022, 5 Pages, Electronic Meeting.

Asustek, "Discussion on maximum UL power change for Dual Tx/Rx Multi-SIM", 3GPP TSG-RAN WG2 Meeting #121bis-e, R2-2303937, Apr. 17-26, 2023, 3 Pages, Electronic.

* cited by examiner (a)

| R | $C_8$ | $C_{16}$ | $C_{24}$ | | | |
|---|---|---|---|---|---|---|
| $C_1$ | $C_9$ | $C_{17}$ | $C_{25}$ | | | |
| $C_2$ | $C_{10}$ | $C_{18}$ | $C_{26}$ | | | |
| $C_3$ | $C_{11}$ | $C_{19}$ | $C_{27}$ | | | |
| $C_4$ | $C_{12}$ | $C_{20}$ | $C_{28}$ | | | |
| $C_5$ | $C_{13}$ | $C_{21}$ | $C_{29}$ | | | |
| $C_6$ | $C_{14}$ | $C_{22}$ | $C_{30}$ | V | PH (Type 2, SpCell of the other MAC entity) | |
| $C_7$ | $C_{15}$ | $C_{23}$ | $C_{31}$ | P | | |

| | |
|---|---|
| | $P_{CMAX,f,c}$ 1 |
| V | PH (Type 1, PCell) |
| P | |
| MPE or R | |
| V | PH (Type X, Serving Cell 1) |
| P | |
| MPE or R | $P_{CMAX,f,c}$ 2 |
| V | PH (Type X, Serving Cell 1) |
| P | |
| MPE or R | $P_{CMAX,f,c}$ 3 |

⋮

| V | PH (Type X, Serving Cell n) |
|---|---|
| P | |
| MPE or R | $P_{CMAX,f,c}$ m |

(b)

| R | $C_8$ | $C_{16}$ | $C_{24}$ | | | |
|---|---|---|---|---|---|---|
| $C_1$ | $C_9$ | $C_{17}$ | $C_{25}$ | | | |
| $C_2$ | $C_{10}$ | $C_{18}$ | $C_{26}$ | | | |
| $C_3$ | $C_{11}$ | $C_{19}$ | $C_{27}$ | | | |
| $C_4$ | $C_{12}$ | $C_{20}$ | $C_{28}$ | | | |
| $C_5$ | $C_{13}$ | $C_{21}$ | $C_{29}$ | | | |
| $C_6$ | $C_{14}$ | $C_{22}$ | $C_{30}$ | V | PH (Type 2, SpCell of the other MAC entity) | |
| $C_7$ | $C_{15}$ | $C_{23}$ | $C_{31}$ | P | | |

| | |
|---|---|
| MPE or R | $P_{CMAX,f,c}$ 1 |
| V | PH (Type 1, PCell) |
| P | |
| MPE or R | $P_{CMAX,f,c}$ 2 |
| V | PH (Type X, Serving Cell 1) |
| P | |
| MPE or R | $P_{CMAX,f,c}$ 3 |
| V | |
| P | |

⋮

| V | PH (Type X, Serving Cell n) |
|---|---|
| P | $P_{CMAX,f,c}$ m |
| MPE or R | |

FIG. 9

WIRELESS COMMUNICATIONS DEVICE USING TWO USIMs

RELATED APPLICATIONS

The present application is a continuation of International Application No. PCT/EP2025/067556, filed on Jun. 23, 2025, entitled "WIRELESS COMMUNICATIONS DEVICE USING TWO USIMs," which claims priority to U.S. Provisional Patent Application No. 63/752,186 filed on Jan. 31, 2025, entitled "IMPROVED POWER HEADROOM REPORT (PHR) REPORTING," the disclosures of which are hereby incorporated herein by reference in their entirety.

TECHNICAL FIELD

The present disclosure relates to a method implemented by a wireless communications device utilizing at least two Universal Subscriber Identity Modules (USIMs) and at least two uplink transmitters (UL Tx) and configured to communicate with a first public mobile network (PLMN) and a second PLMN, a wireless communications device configured to utilize at least two USIMs and at least two UL Tx and configured to communicate with a first mobile network PLMN and a second PLMN, a method implemented by a network node that is operating in a first PLMN and is configured to communicate with a wireless communications device, a network node configured to operate in a first PLMN and to communicate with a wireless communications device, and corresponding non-transitory computer readable media.

BACKGROUND

A Multiple Universal Subscriber Identity Modules (MUSIM) capable wireless communication device or user equipment (UE) may be one which holds two SIM cards, i.e., may operate using two USIMs, which means that the device can handle two different network services. The MUSIM feature has been commercially available for over 10 years. MUSIM has been widely adopted by leading handset manufacturers worldwide and sometimes include adaptations in local markets.

The MUSIM capable UE has one overall maximum output transmission power, where the overall maximum transmission power is reported as one of the UE capabilities. However, it may be difficult for a base station to schedule data transmission for the MUSIM capable UE in an appropriate way, especially regarding power management.

SUMMARY

There currently exist certain challenges. An existing method allows a user equipment (UE) using Multiple Universal Subscriber Identity Modules (MUSIM) and at least two uplink (UL) transmitters (Tx) to transmit a power headroom report (PHR) when the UE activates a second Subscriber Identity Module (SIM) for data transmission or reception, using one of the UL Tx previously allocated to a first SIM. However, this method requires the UE to wait for one or more PHR configuration timers (e.g., a PHR periodic timer and/or a PHR prohibit timer) to expire or lapse before the UE can send a new PHR indicating this power headroom (PH) change. As a result, the base station may continue scheduling data even when the UE lacks the necessary resources to receive it, leading to unnecessary delays and inefficient resource utilization on the network side, highlighting the need for further optimization.

Certain aspects of the disclosure and their embodiments may provide solutions to these or other challenges.

Some embodiments provide a method implemented by a wireless communications device utilizing at least two Universal Subscriber Identity Modules (USIMs) and at least two UL Tx, and configured to communicate with a first public mobile network (PLMN) and a second PLMN. The method comprises transmitting first data to the first PLMN using a first USIM of the at least two USIMs and the at least two UL Tx. The method further comprises transmitting a first PHR to the first PLMN. The method further comprises transmitting second data to the second PLMN using a second USIM of the at least two USIMs and one of the at least two UL Tx. The method further comprises, in response to using the second USIM and the one of the at least two UL Tx to transmit the second data to the second PLMN, transmitting a second PHR to the first PLMN without waiting for an active PHR configuration timer to expire.

Some embodiments provide a wireless communications device. The wireless communications device is configured to utilize at least two USIMs and at least two UL Tx, and is configured to communicate with a first PLMN and a second PLMN. The wireless communications device comprises processing circuitry configured to cause the wireless communications device to become operative to transmit first data to the first PLMN using a first USIM of the at least two USIMs and the at least two UL Tx. The wireless communications device is further operative to transmit a first PHR to the first PLMN. The wireless communications device is further operative to transmit second data to a second PLMN using a second USIM of the at least two USIMs and one of the at least two UL Tx. The wireless communications device is further operative to, in response to using the second USIM and the one of the at least two UL Tx to transmit the second data to the second PLMN, transmit a second PHR to the first PLMN without waiting for an active PHR configuration timer to expire.

Some embodiments include a non-transitory computer readable medium including program code to be executed by processing circuitry of a wireless communications device. Execution of the program code causes the wireless communications device to perform operations. The operations comprise transmitting first data to a first PLMN using a first USIM of at least two USIMs and at least two UL Tx. The operations further comprise transmitting a first PHR to the first PLMN. The operations further comprise transmitting second data to a second PLMN using a second USIM of the at least two USIMs and one of the at least two UL Tx. The operations further include, in response to using the second USIM and the one of the at least two UL Tx to transmit the second data to the second PLMN, transmitting a second PHR to the first PLMN without waiting for an active PHR configuration timer to expire.

Some embodiments provide a method implemented by a network node configured to operate in a first PLMN and configured to communicate with a wireless communications device, wherein the wireless communications device utilizes at least two USIMs and at least two UL Tx, and is configured to communicate with the first PLMN and a second PLMN. The method comprises receiving first data from the wireless communications device, wherein the first data is transmitted from the wireless communications device using a first USIM of the at least two USIMs and the at least two UL Tx. The method further comprises receiving, from the wireless communications device, a first PHR. The method further comprises receiving, from the wireless communications device, a second PHR. The method further comprises determining, using the second PHR, that the wireless communications device transmitted the second PHR without waiting for an active PHR configuration timer to expire. The method further comprises, in response to determining that the wireless communications device transmitted the second PHR without waiting for an active PHR configuration timer to expire, revising uplink scheduling involving the wireless communications device.

Some embodiments provide a network node configured to operate in a first PLMN and configured to communicate with a wireless communications device, wherein the wireless communications device utilizes at least two USIMs and at least two UL Tx and is configured to communicate with the first PLMN and a second PLMN. The network node comprises a processing circuitry configured to cause the network node to become operative to receive first data from the wireless communications device, wherein the first data is transmitted from the wireless communications device using a first USIM of the at least two USIMs and the at least two UL Tx. The network node is further operative to receive, from the wireless communications device, a first PHR. The network node is further operative to receive, from the wireless communications device, a second PHR. The network node is further operative to determine, using the second PHR, that the wireless communications device transmitted the second PHR without waiting for an active PHR configuration timer to expire. The network node is further operative to, in response to determining that the wireless communications device transmitted the second PHR without waiting for an active PHR configuration timer to expire, revise uplink scheduling involving the wireless communications device.

Some embodiments include a non-transitory computer readable medium including program code to be executed by processing circuitry of a network node. Execution of the program code causes the program code to perform operations. The operations comprise receiving first data from a wireless communications device, wherein the first data is transmitted from the wireless communications device using a first USIM of at least two USIMs and at least two uplink transmitters, UL Tx. The operations further comprise receiving, from the wireless communications device, a first PHR. The operations further comprise receiving, from the wireless communications device, a second PHR. The operations further comprise determining, using the second PHR, that the wireless communications device transmitted the second PHR without waiting for an active PHR configuration timer to expire. The operations further comprise, in response to determining that the wireless communications device transmitted the second PHR without waiting for an active PHR configuration timer to expire, revising uplink scheduling involving the wireless communications device.

In accordance with some embodiments, by transmitting PHRs prior to active PHR configuration timer(s) expiring, the amount of time before a base station (BS) revises, e.g., stops or reduces, scheduling resources and data on the carrier of the first PLMN when the UE is unable to receive data due to being occupied by the second PLMN is reduced. In accordance with some embodiments, the UE behavior of transmitting PHRs without waiting for active PHR configuration timer(s) may provide advantages if implemented as a proprietary UE solution or for test scenarios under different conditions and embodiments.

BRIEF DESCRIPTION OF THE DRAWINGS

The accompanying drawings, which are included to provide a further understanding of the disclosure and are incorporated in and constitute a part of this application, illustrate certain non-limiting embodiments of the present disclosure. In the drawings:

FIG. 9 shows Multiple Entry PHR MAC CE with the highest ServCellIndex of Serving Cell with configured uplink is less than 8 (a) and equal to or higher than 8 (b); and

DETAILED DESCRIPTION

Figure 1:
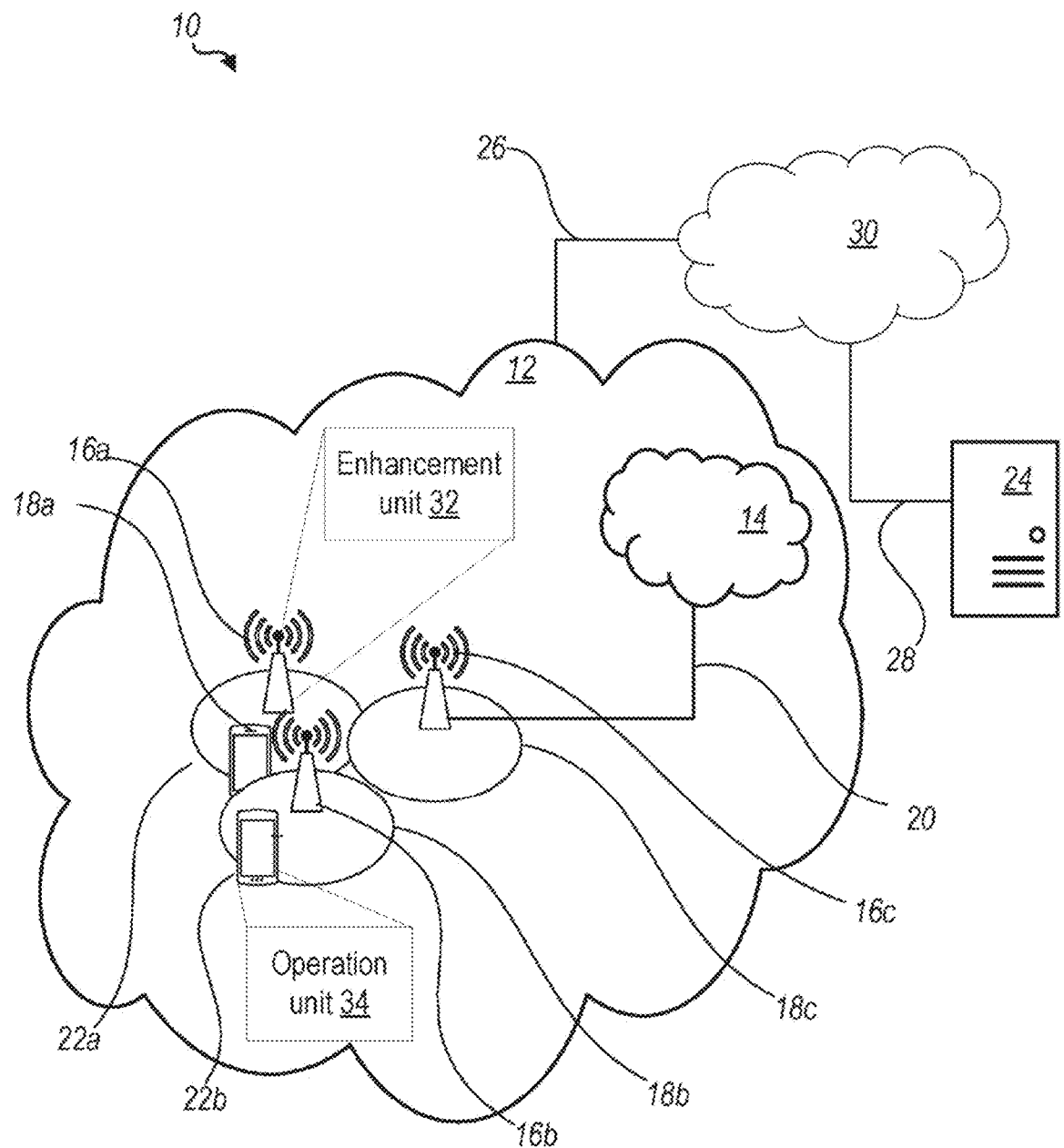
FIG. 1 is a schematic diagram of an example network architecture illustrating a communication system connected via an intermediate network to a host computer according to some embodiments.

Some of the embodiments contemplated herein will now be described more fully with reference to the accompanying drawings. Embodiments are provided by way of example to convey the scope of the subject matter to those skilled in the art, in which examples of embodiments of the present disclosure are shown. Inventive concepts may, however, be embodied in many different forms and should not be construed as limited to the embodiments set forth herein. Rather, these embodiments are provided so that this disclosure will be thorough and complete, and will fully convey the scope of the present disclosure to those skilled in the art. It should also be noted that these embodiments are not mutually exclusive. Components from one embodiment may be tacitly assumed to be present/used in another embodiment.

An existing method allows a user equipment (UE) using Multiple Universal Subscriber Identity Modules (MUSIM) and at least two uplink (UL) transmitters (Tx) to transmit a power headroom report (PHR) when the UE activates a second Subscriber Identity Module (SIM) for data transmission or reception, using one of the UL Tx previously allocated to a first SIM. However, this method requires the UE to wait for PHR configuration timers (e.g., a PHR periodic timer and/or a PHR prohibit timer) to expire or lapse before reporting the PHR. As a result, the base station may continue scheduling data even when the UE lacks the necessary resources to receive it, leading to unnecessary delays. For example, assuming the Radio Access Network (RAN) typically configures the PHR PeriodicTimer to 100 ms, if the UE activates a second SIM for data transmission or reception using one of the UL Tx previously allocated to a first SIM, then in the worst case scenario, the UE must wait for the full 100 ms before reporting an updated power headroom (PH) value in the PHR. As such, PHR waiting periods can result in unnecessary delays and inefficient resource utilization on the network side, highlighting the need for further optimization.

One or more embodiments described herein improve PHR reporting for UEs that utilizes at least two Universal Subscriber Identity Modules (USIMs) and at least two UL Tx and configured to communicate with a first public mobile network (PLMN) and a second PLMN. Such embodiments may achieve this improvement by ignoring or overriding certain PHR reporting triggering conditions defined in the 3GPP standard (e.g., Section 5.4.6 in 3GPP TS 38.321, v18.4.0) to reduce delays in reporting. For instance, under the existing standard, a UE performing PHR reporting may wait for the phr-PeriodicTimer to expire or for the phr-ProhibitTimer to expire with the path loss condition fulfilled before sending a second PHR when the UE activates a second PLMN using one of the at least two UL Tx previously allocated to a first PLMN. In contrast, a UE in accordance with one or more embodiments described herein can trigger PHR reporting in response to the UE connecting to a second PLMN in RRC_Connected mode and dropping one of the UL carriers without waiting for an active PHR configuration timer to expire. In other words, a UE in accordance with one or more embodiments described herein can bypass the phr-PeriodicTimer, the phr-ProhibitTimer, or other standard conditions that would otherwise delay the PHR. This enhancement allows for more responsive scheduling adjustments by the network, improving overall efficiency in MUSIM operation scenarios.

Some embodiments disclosed herein are directed to PLMNs. The person skilled in the art will appreciate that the embodiments are also applicable to other types of networks such as Non-Public Networks (NPNs).

Some embodiments disclosed herein are directed to UEs having two UL Tx. However, the embodiments are also applicable for UEs with more than two UL Tx. Similarly, some embodiments disclosed herein are directed to a UE using or being configured for Carrier Aggregation (CA). However, the embodiments disclosed herein are not limited to CA but are also applicable to UEs using or being configured for Dual Connectivity (DC).

In some embodiments transmitting or receiving to or from the PLMN includes transmitting or receiving to or from a network node of the PLMN. This may include transmitting or receiving data and/or PHR.

Before describing in detail example embodiments, it is noted that various embodiments reside primarily in combinations of apparatus components and processing steps related to PHR reporting. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc.

In some embodiments, the non-limiting terms wireless device (WD), wireless communications device, or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a network node may be distributed over a plurality of network nodes. In other words, it is contemplated that the functions of the network node described herein are not limited to performance by a single physical device and, in fact, can be distributed among several physical devices.

Unless otherwise indicated, the terms "USIM" and "SIM" may be used herein interchangeably.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Various embodiments described herein allow a UE configured to communicate with a first and a second PLMN using MUSIM to transmit a PHR without waiting for an active PHR configuration timer to expire.

Referring now to the figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless communications device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless communications devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an enhancement unit 32 which is configured to perform one or more network node 16 functions as described herein such as with respect to PHR reporting for MUSIM. A wireless communications device 22 is configured to include an operation unit 34 which is configured to perform one or more wireless communications device 22 functions as described herein such as with respect to PHR reporting for MUSIM.

Example implementations, in accordance with an embodiment, of the WD 22, the network node 16, and the host computer 24 discussed in the preceding paragraphs, will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In some embodiments, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless communications device 22. The processing circuitry 42 of the host computer 24 may include an information unit 54 configured to enable the service provider to process, store, transmit, receive, forward, relay, determine, configure, reconfigure, etc., information related to PHR reporting for MUSIM that is described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include enhancement unit 32 configured to perform one or more network node 16 functions as described herein such as with respect to PHR reporting for MUSIM.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless communications device 22 may include an operation unit 34 configured to perform one or more wireless communications device 22 functions as described herein such as with respect to PHR reporting for MUSIM.

Carrier Aggregation

Carrier Aggregation (CA) is generally used in 3rd Generation Partnership Project (3GPP) New Radio (NR, also referred to as 5th Generation (5G)) and Long Term Evolution (LTE, also referred to as 4th Generation (4G)) systems to improve wireless communications device transmit/receive data rate as compared to systems which do not use CA. With CA, the wireless communications device typically operates initially on a single serving cell referred to as a primary cell (Pcell). The Pcell is operated on a component carrier in a frequency band. The wireless communications device is then configured by the network/network node with one or more secondary serving cells (SCell(s)). Each SCell can correspond to a component carrier (CC) in the same frequency band (intra-band CA) or a different frequency band (inter-band CA) from the frequency band of the CC corresponding to the Pcell. For the wireless communications device to transmit/receive data on the SCell(s) (e.g., by receiving downlink (DL)-shared channel (SCH) information on a physical downlink shared channel (PDSCH) or by transmitting uplink-shared channel (UL-SCH) information/data on a physical uplink shared channel (PUSCH)), the SCell(s) may need to be activated by the network/network node. The SCell(s) can also be deactivated and later reactivated as needed via activation/deactivation signaling.

Dual Connectivity

Dual Connectivity (DC) is generally used in NR (5G) and LTE systems to help improve wireless communications device transmit and receive data rates. With DC, the wireless communications device typically operates with a master cell group (MCG) and a secondary cell group (SCG). Each cell group can have one or more serving cells. The MCG cell, operating on the primary frequency, in which the wireless communications device either performs the initial connection establishment procedure or initiates the connection re-establishment procedure, is referred to as the primary cell or PCell. The SCG cell in which the wireless communications device performs random access when performing the Reconfiguration with Sync procedure is referred to as the primary SCG cell or PSCell.

In some cases, the term "primary cell" or "primary serving cell" can refer to PCell for a wireless communications device not configured with DC, and/or can refer to PCell of MCG or PSCell of SCG for a wireless communications device configured with DC.

Power Headroom Report

Power headroom indicates how much transmission power is left for a UE to use in addition to the power being used by current transmission. Power Headroom can be defined by the equation:

$$\text{Power Headroom} = \text{UE Maximum Output Transmission Power} - \text{PUCCH,PUSCH,SRS Power}$$

If the Power Headroom value is positive, it indicates that the UE still has transmission power to transmit data. If the power Headroom value is negative, it indicates that the UE is already transmitting at a transmission higher or equal to the maximum output power and there is no output power left to transmit data. PHR is a transmitted as a MAC CE (MAC Control Element) that reports the headroom between the current UE Tx power (estimated power) and the nominal power. The base station uses this report value to estimate how much uplink bandwidth a UE can use for a specific subframe. The more resource block (RB) the UE is using, the higher the UE Tx power, but the UE Tx power should not exceed the maximum output power. There are two triggers for PHR (Power Headroom Report). Firstly, if Path Loss Change is greater than a certain threshold. The UE can calculate the path loss based on reference signal (RS) power notified by the network and the measured RS power at UE antenna port. If this value exceeds a certain threshold, the UE transmits a PHR. Secondly, by a period timer. The triggers are specified in RRC (Radio Resource Control) messages (see Section 6.3.2, PHR-config, in 3GPP TS 38.331, v18.4.0).

Multi USIM (MUSIM)

In wireless communication systems, support for multi-USIM based operations in a UE may be handled in an implementation-specific manner without any support from 3rd Generation Partnership Project (3GPP) specifications, resulting in a variety of implementations and UE behaviors. In a multi-USIM device, the USIMs, also referred to as SIMs, typically share common radio and baseband components. Thus, the multi-USIM device may register in different networks using one radio front-end (RF) and baseband component. Legacy Multi-SIM supports Dual SIM Dual Standby (DSDS) type operation. In DSDS, only one of the USIM is actively connected to a PLMN with an RRC_Connected mode to receive data, while the other USIM is in an RRC_Idle/RRC_inactive mode. This is based on the legacy UE architecture using Single-Rx or Dual-Rx together with a Single-Tx supported up to Rel-17 of the 3rd Generation Partnership Project (3GPP). For a UE only supporting a Single-Tx, the Multi-SIM operations are limited. More specifically, while the first USIM is in active connected mode (transmitting and/or receiving data), the second USIM is in idle mode. There is no possibility for UL feedback from the UE to the network side for the second USIM since the single Tx is occupied by the UL transmissions of the first USIM.

MUSIM and DSDA

According to GSMA TS.37, "Requirements for Multi SIM Devices" v4.0, DSDA is defined as following.

Dual SIM Dual Active (DSDA): both SIMs can be used in both idle and connected modes. Each SIM has a dedicated transceiver, meaning that there are no interdependencies on idle or connected mode operation at the modem level. Note that in some DSDA devices the second transceiver may be 2G-only.

Since Rel-18, 3GPP started the WI on Multi-SIM, RP-220955, with the justification as following, where it is based on a new UE architecture as Dual Rx/Dual-Tx UE.

The Dual-Tx, which is a mandatory architecture to support Dual-Connectivity, now benefits the Multi-SIM feature, so both of the USIMs can be in active mode as RRC_Connected mode with two UL chains to support the UL feedback loops.

BEGIN
RP-220955=====================================
============

Enhancements for MUSIM procedures to operate in RRC_ CONNECTED state simultaneously in NW A and NW B. [RAN2, RAN3, RAN4].

Specify mechanism to indicate preference on temporary UE capability restriction and removal of restriction (e.g. capability update, release of cells, (de) activation of configured resources) with NW A when UE needs transmission or reception (e.g., start/stop connection to NW B) for MUSIM purpose RAT Concurrency: Network A is NR SA (with CA) or NR DC. Network B can either be LTE or NR.

Applicable UE architecture: Dual-RX/Dual-TX UE

Rel-18 WI for MUSIM

In Release 18 of the 3GPP standard the work on MUSIM was initiated with the below justification:

=============================================
===================

MUSIM UE's hardware capabilities are shared by the SIMs, and to use the hardware efficiently and economically, the related capabilities need to be dynamically split between the two SIMs. This can lead to a temporary hardware conflict for the UE, which may require UE to release some resources (e.g., SCell/SCG) from one SIM. For example, when the UE's SIM A is in RRC connected state in NW A while the UE's SIM B is in RRC Idle or RRC Inactive in NW B, the two RF chains will be occupied by the SIM A for the communication in NW A. Once the UE's SIM B enters into RRC connected state, one of the RF chains needs to be switched to SIM B. In this case, if the NW A is not aware of the UE's reduced capability change in RF chain, there may be data loss due to demodulation failure and wasting radio resources in NW A. To avoid this, assistance from UE to network A on these temporary UE (capability) restrictions can be beneficial.

=============================================
===================

The work item (WI) in Release 18 was based on a new UE architecture, Dual Rx/Dual-Tx UE. Dual-Tx, which is a mandatory architecture to support Dual-Connectivity, could also benefit from the Multi-SIM feature since both USIMs can be in active mode with two UL chains to support the UL feedback loops.

The objectives of the WI were to specify temporary UE capability with the possibility of releasing the UE capability from one USIM to both USIM, and reenabling the UE capability from both USIM to one USIM.

=============================================
===================

Enhancements for MUSIM procedures to operate in RRC_ CONNECTED state simultaneously in NW A and NW B. [RAN2, RAN3, RAN4].

Specify mechanism to indicate preference on temporary UE capability restriction and removal of restriction (e.g., capability update, release of cells, (de) activation of configured resources) with NW A when UE needs transmission or reception (e.g., start/stop connection to NW B) for MUSIM purpose RAT Concurrency: Network A is NR SA (with CA) or NR DC. Network B can either be LTE or NR.

Applicable UE architecture: Dual-RX/Dual-TX UE

The work item shall identify whether the WI will have RAN3 or RAN4 impacts by RAN #99 [RAN2].

END
RP-220955=====================================
============

UL Power Control Procedure and PHR

Power Control and Power Capability

Power capability determines the maximum UE uplink power per cell or for carrier aggregation (CA). The uplink power remaining given a transmission allocation by the base station is reported to the base station by power headroom reporting.

The UE output power for uplink transmissions UE to BS is controlled independently for each cell c and carrier frequency f. The power control for uplink transmissions in a transmission occasion i typically involves both open- and closed-loop control, $$P_{f,c}(i) = \min[P_{CMAX,f,c}(i), P_0 + \alpha_{f,c} PL_{f,c} + 10 \log M_{f,c}(i) + \Delta_{f,c}(i) + \delta_{f,c}(i)],$$

where $P_0$ is the target received power at the receiver (the gNB for NR), $PL_{f,c}$ the path-loss estimate with a weight factor $\alpha_{c,f}$ (the sum $P_0 + \alpha_{f,c} PL_{f,c}$ the transmission resources required output power per resource for open-loop control), $M_{f,c}$ the allocated resource bandwidth, $\Delta_{f,c}$ including factors such as the uplink modulation format, and $\delta_{f,c}$ a relative power change for closed-loop control.

The output power as determined by open- and closed loop power is limited by the maximum output power $P_{CMAX,f,c}(i)$ configured (computed) by the UE for cell c and carrier frequency f. The configured $P_{CMAX,f,c}(i)$ applies for all types of transmissions (PUCCH, PUSCH and SRS) and is in turn capped by the power capability $P_{power\ class}$. For NR in frequency range FR1 below 7 GHz for which the output power can be measured at the antenna connector, the $P_{CMAX,f,c}(i)$ configured can essentially be described by $$P_{CMAX,f,c}(i) \sim \min[P_{power\ class}, f(P_{power\ class}, MPR), P_{Max}],$$

and hence limited by the power capability $P_{power\ class}$ of the UE, indicated to the network by UE capability signaling, a function $f(P_{power\ class}, MPR) \leq P_{power\ class}$ of the power capability and maximum power reductions MPR allowed for compliance with, e.g., unwanted emissions requirements, and a cell-specific or UE-specific limitation $P_{Max}$ (absolute) indicated to the UE by the network in the system information broadcasted in the cell or by dedicated signaling to the UE.

The UE is allowed a power-back-off up to MPR (dB) but does not necessarily use the full allowance. The $P_{CMAX,f,c}(i)$ is therefore specified in a range for a single serving cell in FR1 (Section 6.2.4 in 3GPP TS 38.101-1, v18.8.0).

The configured maximum output power $P_{CMAX,f,c}$ is set within the following bounds:

$$P_{CMAX\_L,f,c} \leq P_{CMAX,f,c} \leq P_{CMAX\_H,f,c} \text{ with}$$

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c + \Delta MPR_c, A\text{-}MPR_c) + \Delta T_{IB,c} + \Delta T_{C,c} + \Delta T_{RxSRS}, P\text{-}MPR_c)\}$$

$$P_{CMAX\_H,f,c} = \text{MIN}\{P_{EMAX,c}, P_{PowerClass} - \Delta P_{PowerClass}\},$$

where the lower bound is governed by the maximum allowed back-off MPR while both the upper and lower bounds are limited by the power class (power capability) $P_{power\ class}$ and a cell-specific limit class $P_{Max}$ (the $P_{EMAX,c}$).

Other allowed power reductions accounting for, e.g., filter attenuation ($\Delta T_C$) also reduce the lower bound at the edges of carriers but are not included in what follows for notational simplicity without loss of generality. The upper bound corresponds to the case in which the UE is not applying any power back-off and is limited by the power class and power limits only. The power class may be modified by $\Delta P_{powerclass}$ in case the maximum power capability must be reduced for, e.g., exposure compliance (SAR).

Carrier Aggregation and Power Capability

In carrier aggregation (CA), the UE configures a maximum total power $P_{CMAX}$ for all aggregated serving cells of a CA combination. For FR1 the $P_{CMAX}$ is specified at the antenna connector and includes the power back-off applied on the serving cells part of the CA configuration; for inter-band UL CA the is essentially the sum of the configured power per cell and capped by the power class $\Delta P_{power\ class, CA}$ of the CA band combination:

The total configured maximum output power $P_{CMAX}$ shall be set within the following bounds:

$$P_{CMAX\_L} \leq P_{CMAX} \leq P_{CMAX\_H}$$

For uplink inter-band carrier aggregation with one serving cell c per operating band when same slot symbol pattern is used in all aggregated serving cells, $$P_{CMAX\_L} = MIN\{10 \quad \log_{10}\Sigma \quad MIN[p_{EMAX,c}/(\Delta t_{C,c}), \\ p_{PowerClass,c}/(MAX(mpr_c \cdot \Delta mpr_c, a \cdot mpr_c) \cdot \\ \Delta t_{C,c} \cdot \Delta t_{IB,c} \cdot \Delta t_{RxSRS,c}), p_{PowerClass,c}/pmpr_c], \\ P_{EMAX,CA}, P_{PowerClass,CA} - \Delta P_{PowerClass,CA}\} \text{ and} \\ P_{CMAX\_H} = MIN\{10 \log_{10}\Sigma p_{EMAX,c}, P_{EMAX,CA}, \\ P_{PowerClass,CA} - \Delta P_{PowerClass,CA}.$$

The configured total power $P_{CMAX}$ for all aggregated serving cells of a CA combination is used for prioritizations of transmission power when the UE is power limited.

Prioritizations for Transmission Power Reductions

For single cell operation with two uplink carriers or for operation with carrier aggregation, if a total UE transmit power for PUSCH or PUCCH or PRACH or SRS transmissions on serving cells in a frequency range in a respective transmission occasion i would exceed $\hat{P}_{CMAX}(i)$, where $\hat{P}_{CMAX}(i)$ is the linear value of $P_{CMAX}(i)$ in transmission occasion i as defined in 8-1 of 3GPP TS 38.101-1 (v18.8.0) for FR1 and 8-2 of 3GPP TS38.101-2 (v18.8.0) for FR2, the UE allocates power to PUSCH/PUCCH/PRACH/SRS transmissions according to the following priority order (in descending order) so that the total UE transmit power for transmissions on serving cells in the frequency range is smaller than or equal to $\hat{P}_{CMAX}(i)$ for that frequency range in every symbol of transmission occasion i. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.

- PRACH transmission on the Pcell
- PUCCH or PUSCH transmissions with higher priority index according to Clause 9
- For PUCCH or PUSCH transmissions with same priority index
  - PUCCH transmission with HARQ-ACK information, and/or SR, and/or LRR, or PUSCH transmission with HARQ-ACK information
  - PUCCH transmission with CSI or PUSCH transmission with CSI
  - PUSCH transmission without HARQ-ACK information or CSI and, for Type-2 random access procedure, PUSCH transmission on the PCell
- SRS transmission, with aperiodic SRS having higher priority than semi-persistent and/or periodic SRS, or PRACH transmission on a serving cell other than the PCell In case of same priority order and for operation with carrier aggregation, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

Given a total power $P_{CMAX}$, the UE allocates power for transmission types in a priority order when power limited. This means that e.g., that the primary cell (PCell) is prioritized for a given transmission, e.g., for simultaneous PUSCH transmissions on multiple serving cells.

The power class of the CA configuration can also be modified by a to account for MPE requirements by $\Delta P_{power\ class, CA}$ for concurrent uplink transmissions on more several uplink serving cells. This means that the UE would start prioritizing the uplink power by $\Delta P_{power\ class, CA}$ at a lower output power (dB scale). The conditions at which this is allowed is specified for selected cases and can depend on the uplink duty cycles on the serving cells. The power class for band combination (CA or dual-connectivity) may be different from the power-class for the constituent bands. In case the $P_{power\ class, CA}$, possibly modified by $\Delta P_{power\ class, CA}$, for the band combination is lower than the $P_{power\ class}$ for constituent band, transmission power on the latter would be prioritized (reduced).

Power Headroom Reporting

The power capability determines the power headroom (PH) reported in the power-headroom report (PHR):

$$PH = P_{CMAX,f,c}(i) - [P_0 + \alpha_{f,c} PL_{f,c} + 10\log M_{f,c}(i) + \Delta_{f,c}(i) + \delta_{f,c}(i)]$$

the ratio/difference (linear/dB) between the configured maximum output power (depending on the power class)

$$P_{CMAX,f,c}(i) \sim \min[P_{power\ class}, f(P_{power\ class}, MPR), P_{Max}]$$

and the estimated output power required for the uplink transmission scheduled by the BS. A positive value (in dB) means that there is remaining power available while a negative PH means that the uplink power is capped by the maximum power and that there is a power deficiency for the uplink allocation. The maximum output power is also reported in the PHR.

In case the maximum power is modified by $\Delta P_{power\ class}$ or P-MPR (or any other power back-off included in the $P_{CMAX,f,c}$) then the PH is changed for a given scheduled uplink transmission.

The PH can be based on an actual transmission with a scheduled uplink resource ($M_{f,c}(i)$ in the expression above) or a reference format without a scheduled resource and an assumption that all power back-off are set to zero (including P-MPR). The UE determines the PHR as follows [2, 3GPP TS 38.321, v18.4.0]: the UE determines whether PH value for an activated Serving Cell is based on real transmission or a reference format by considering the configured grant(s) or periodic/semi-persistent SRS transmissions and downlink control information which has been received until and including the PDCCH occasion in which the first UL grant for a new transmission is received since a PHR has been triggered if the PHR MAC CE is reported on an uplink grant received on the PDCCH or until the first uplink symbol of PUSCH transmission minus PUSCH preparation time as defined in 3GPP TS 38.214 (v18.5.0) if the PHR MAC CE is reported on a configured grant.

The $\Delta P_{powerclass}$ affects the PHR for both an actual transmission and the reference format for both PUSCH and SRS. The application of $\Delta P_{powerclass}$ in time is up to UE implementation.

PHR is reported for PUSCH (Type 1) and SRS (Type 3). PH can be either single-entry (for a serving cell) or multi-entry including serving cells of a MR-DC or UL CA band combination. The latter is configured for the said band combinations, otherwise single-entry.

The PHR can be either periodic (typically 20-50 milliseconds) or triggered with phr-PeriodicTimer by events such as DL path loss changes affecting the UL power required or a P-MPR change if this is above a configurable threshold value. According to 3GPP TS 38.321, v18.4.0, section 5.4.6, a PHR shall be triggered if any of the following events occur:

phr-ProhibitTimer expires or has expired and the path loss has changed more than phr-Tx-PowerFactorChange dB [configurable threshold] for at least one RS used as pathloss reference for one activated Serving Cell of any MAC entity of which the active DL BWP is not dormant BWP since the last transmission of a PHR in this MAC entity when the MAC entity has UL resources for new transmission;

Relating to SAR and MPE compliance, a PHR is also triggered if the P-MPR is changed more than a configurable threshold with phr-Tx-PowerFactorChange for more than a few tenths of milliseconds (SAR a long-term average) when the UE has UL resources for new transmission:

there are UL resources allocated for transmission or there is a PUCCH transmission on this cell, and the required power backoff due to power management (as allowed by P-MPRc as specified in TS 38.101-1, TS 38.101-2, and TS 38.101-3, v18.8.0) for this cell has changed more than phr-Tx-PowerFactorChange dB since the last transmission of a PHR when the MAC entity had UL resources allocated for transmission or PUCCH transmission on this cell.

According to 3GPP TS 38.321, v18.4.0, PHR is defined as:

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e., E-UTRA MAC entity in EN-DC, NE-DC, and NGEN-DC cases);

Type 3 power headroom: the difference between the nominal UE maximum transmit power and the estimated power for SRS transmission per activated Serving Cell;

MPE P-MPR: the power backoff to meet the MPE FR2 requirements for a Serving Cell operating on FR2.

RRC controls Power Headroom reporting by configuring the following parameters:
phr-Periodic Timer;
phr-ProhibitTimer;
phr-Tx-PowerFactorChange;
phr-Type 2OtherCell;
phr-ModeOtherCG;
multiple PHR;
mpe-Reporting-FR2;
mpe-ProhibitTimer;
mpe-Threshold;
memberOfN;
mpe-ResourcePool;
twoPHRMode.

A Power Headroom Report (PHR) shall be triggered if any of the following events occur:

phr-Prohibit Timer expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].

phr-Periodic Timer expires;
upon configuration or reconfiguration of the power headroom reporting functionality by upper layers, which is not used to disable the function;
activation of an SCell of any MAC entity with configured uplink of which firstActiveDownlinkBWP-Id is not set to dormant BWP;
activation of an SCG;
addition of the PSCell except if the SCG is deactivated (i.e., PSCell is newly added or changed);
phr-ProhibitTimer expires or has expired, when the MAC entity has UL resources for new transmission, and the following is true for any of the activated Serving Cells of any MAC entity with configured uplink:
there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink;
if mpe-Reporting-FR2 is configured, and mpe-ProhibitTimer is not running:
the measured P-MPR applied to meet FR2 MPE requirements as specified in TS 38.101-2 [15] is equal to or larger than mpe-Threshold for at least one activated FR2 Serving Cell since the last transmission of a PHR in this MAC entity; or the measured P-MPR applied to meet FR2 MPE requirements as specified in TS 38.101-2 [15] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.

in which case the PHR is referred below to as 'MPE P-MPR report'.

NOTE 2: The MAC entity should avoid triggering a PHR when the required power backoff due to power management decreases only temporarily (e.g., for up to a few tens of milliseconds) and it should avoid reflecting such temporary decrease in the values of $P_{CMAX,f,c}$/PH when a PHR is triggered by other triggering conditions.

NOTE 3: If a HARQ process is configured with cg-RetransmissionTimer and if the PHR is already included in a MAC PDU for transmission on configured grant by this HARQ process, but not yet transmitted by lower layers, it is up to UE implementation how to handle the PHR content.

PHR Configuration as RRC Configuration

The RRC configuration to configure PHR for the UE to be reported is specified in [2, 3GPP TS 38.331] as following.

PHR-Config

The IE PHR-Config is used to configure parameters for power headroom reporting.

PHR-Config Information Element
    ASN1START
    TAG-PHR-CONFIG-START

```
PHR-Config ::=                          SEQUENCE {
    phr-PeriodicTimer                       ENUMERATED {sf10,
sf20, sf50, sf100, sf200, sf500, sf1000, infinity},
    phr-ProhibitTimer                       ENUMERATED {sf0,
sf10, sf20, sf50, sf100, sf200, sf500, sf1000},
    phr-Tx-PowerFactorChange                ENUMERATED {dB1,
dB3, dB6, infinity},
    multiplePHR                             BOOLEAN,
    dummy                                   BOOLEAN,
    phr-Type2OtherCell                      BOOLEAN,
    phr-ModeOtherCG                         ENUMERATED {real,
virtual},
    ...,
    [[
    mpe-Reporting-FR2-r16                   SetupRelease { MPE-
Config-FR2-r16 }                        OPTIONAL    -- Need M
    ]],
    [[
    mpe-Reporting-FR2-r17                   SetupRelease { MPE-
Config-FR2-r17 }                        OPTIONAL,   -- Need M
    twoPHRMode-r17                          ENUMERATED {enabled}
OPTIONAL    -- Need R
    ]],
    [[
    phr-AssumedPUSCH-Reporting-r18          ENUMERATED {enabled}
OPTIONAL,    -- Need R
    dpc-Reporting-FR1-r18                   ENUMERATED {enabled}
OPTIONAL    -- Need R
    ]]
}
MPE-Config-FR2-r16 ::=                  SEQUENCE {
    mpe-ProhibitTimer-r16                   ENUMERATED {sf0,
sf10, sf20, sf50, sf100, sf200, sf500, sf1000},
    mpe-Threshold-r16                       ENUMERATED {dB3,
dB6, dB9, dB12}
}
MPE-Config-FR2-r17 ::=                  SEQUENCE {
    mpe-ProhibitTimer-r17                   ENUMERATED {sf0,
sf10, sf20, sf50, sf100, sf200, sf500, sf1000},
    mpe-Threshold-r17                       ENUMERATED {dB3,
dB6, dB9, dB12} ,
    numberOfN-r17                           INTEGER (1..4),
    ...
}
```

TAG-PHR-CONFIG-STOP
ASN1STOP

| PHR-Config field descriptions |
|---|
| dpc-Reporting-FR1 |
| Indicates if the delta power class (DPC) is reported, as specified in TS 38.321 [3]. |
| dummy |
| This field is not used in this version of the specification and the UE ignores the received value. |
| mpe-ProhibitTimer |
| Value in number of subframes for MPE reporting, as specified in TS 38.321 [3]. Value sf10 corresponds to 10 subframes, and so on. |
| mpe-Reporting-FR2 |
| Indicates whether the UE shall report MPE P-MPR in the PHR MAC control element, as specified in TS 38.321 [3]. |
| mpe-Threshold |
| Value of the P-MPR threshold in dB for reporting MPE P-MPR when FR2 is configured, as specified in TS 38.321 [3]. The same value applies for each serving cell (although the associated functionality is performed independently for each cell). |
| multiple PHR |
| Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases. |
| numberOfN |
| Number of reported P-MPR values in a PHR MAC CE. |
| phr-AssumedPUSCH-Reporting |
| Indicates if the PHR with an assumed PUSCH is reported, as specified in TS 38.321 [3]. The network ensures phr-AssumedPUSCH-Reporting-r18 and twoPHRMode-r 17 are not configured at the same time for a UE. |
| phr-ModeOtherCG |
| Indicates the mode (i.e. real or virtual) used for the PHR of the activated cells that are part of the other Cell Group (i.e. MCG or SCG), when DC is configured. If the UE is configured with only one cell group (no DC), it ignores the field. |
| phr-Periodic Timer |
| Value in number of subframes for PHR reporting as specified in TS 38.321 [3]. Value sf10 corresponds to 10 subframes, value sf20 corresponds to 20 subframes, and so on. |
| phr-ProhibitTimer |
| Value in number of subframes for PHR reporting as specified in TS 38.321 [3]. Value sf0 corresponds to 0 subframe, value sf10 corresponds to 10 subframes, value sf20 corresponds to 20 subframes, and so on. |
| phr-Tx-Power FactorChange |
| Value in dB for PHR reporting as specified in TS 38.321 [3]. Value dB1 corresponds to 1 dB, dB3 corresponds to 3 dB and so on. The same value applies for each serving cell |

| PHR-Config field descriptions |
|---|
| (although the associated functionality is performed independently for each cell). |
| phr-Type2OtherCell |
| If set to true, the UE shall report a PHR type 2 for the SpCell of the other MAC entity. See TS 38.321 [3], clause 5.4.6. Network sets this field to false if the UE is not configured with an E-UTRA MAC entity. |
| twoPHRMode |
| Indicates if the power headroom shall be reported as two PHRs (each PHR associated with a SRS resource set) is enabled or not. The network ensures phr-AssumedPUSCH-Reporting-r18 and twoPHRMode-r17 are not configured at the same time for a UE. |

PHR Definition for Type 1 and Type 3

According to 3GPP TS 38.213, v18.5.0, PHR is defined as:

7.7 Power Headroom Report

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c.

A UE determines whether a power headroom report for an activated serving cell [11, TS 38.321] is based on an actual transmission or a reference format based on the higher layer signaling of configured grant and periodic/semi-persistent sounding reference signal transmissions and downlink control information the UE received until and including the PDCCH monitoring occasion where the UE detects the first DCI format scheduling an initial transmission of a transport block since a power headroom report was triggered if the power headroom report is reported on a PUSCH triggered by the first DCI format. Otherwise, a UE determines whether a power headroom report is based on an actual transmission or a reference format based on the higher layer signaling of configured grant and periodic/semi-persistent sounding reference signal transmissions and downlink control information the UE received until the first uplink symbol of a configured PUSCH transmission minus T'proc,2=Tproc,2 where Tproc,2 is determined according to [6, TS 38.214] assuming $d_{2,1}=1$, $d_{2,2}=0$, and with $\mu DL$ corresponding to the subcarrier spacing of the active downlink BWP of the scheduling cell for a configured grant if the power headroom report is reported on the PUSCH using the configured grant.

If a UE
  is configured with two UL carriers for a serving cell, and determines a Type 1 power headroom report and a Type 3 power headroom report for the serving cell
  the UE
  provides the Type 1 power headroom report if both the Type 1 and Type 3 power headroom reports are based on respective actual transmissions or on respective reference transmissions
  provides the power headroom report that is based on a respective actual transmission if either the Type 1 report or the Type 3 report is based on a respective reference transmission If a UE is configured with a SCG and if phr-ModeOtherCG for a CG indicates 'virtual' then, for power headroom reports transmitted on the CG, the UE computes PH assuming that the UE does not transmit PUSCH/PUCCH on any serving cell of the other CG. For NR-DC when both the MCG and the SCG operate either in FR1 or in FR2 and for a power headroom report transmitted on the MCG or the SCG, the UE computes PH assuming that the UE does not transmit PUSCH/PUCCH on any serving cell of the SCG or the MCG, respectively.

If the UE is configured with a SCG,
For computing power headroom for cells belonging to MCG, the term 'serving cell' in this clause refers to serving cell belonging to the MCG.
For computing power headroom for cells belonging to SCG, the term 'serving cell' in this clause refers to serving cell belonging to the SCG. The term 'primary cell' in this clause refers to the PSCell of the SCG.

If the UE is configured with a PUCCH-SCell,
For computing power headroom for cells belonging to primary PUCCH group, the term 'serving cell' in this clause refers to serving cell belonging to the primary PUCCH group.
For computing power headroom for cells belonging to secondary PUCCH group, the term 'serving cell' in this clause refers to serving cell belonging to the secondary PUCCH group. The term 'primary cell' in this clause refers to the PUCCH-SCell of the secondary PUCCH group.

For a UE configured with EN-DC/NE-DC and capable of dynamic power sharing, if E-UTRA Dual Connectivity PHR [14, TS 36.321] is triggered and,
if the duration of NR slot on active UL BWP is different from that of E-UTRA subframe carrying the Dual Connectivity PHR, the UE provides power headroom of the first NR slot that fully overlaps with the E-UTRA subframe;
if the duration of NR slot on active UL BWP is the same as that of E-UTRA subframe carrying the Dual Connectivity PHR for asynchronous EN-DC/NE-DC [10, TS 38.133], the UE provides power headroom of the first NR slot that overlaps with the E-UTRA subframe.

7.7.1 Type 1 PH Report

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i, j, q_d, l) =$$
$$P_{CMAX,f,c}(i) - \{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}[dB]$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i, l)$ are defined in clause 7.1.1.

If a UE is configured with multiple cells for PUSCH transmissions, where a SCS configuration #1 on active UL BWP $b_1$ of carrier $f_1$ of serving cell $c_1$ is smaller than a SCS configuration #2 on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$. If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If a UE is configured with multiple cells for PUSCH transmissions and provides a Type 1 power headroom report in a PUSCH transmission with PUSCH repetition Type B having a nominal repetition that spans multiple slots on active UL BWP $b_1$ and overlaps with one or more slots on active UL BWP $b_2$, the UE provides a Type 1 power headroom report for the first PUSCH, if any, on the first slot of the one or more slots on active UL BWP $b_2$ that overlaps with the multiple slots of the nominal repetition on active UL BWP $b_1$.

For a UE configured with EN-DC/NE-DC and capable of dynamic power sharing, if E-UTRA Dual Connectivity PHR [14, TS 36.321] is triggered, the UE provides power headroom of the first PUSCH, if any, on the determined NR slot as described in clause 7.7.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if
the second PUSCH transmission is scheduled by a DCI format in a PDCCH received in a second PDCCH monitoring occasion, and
the second PDCCH monitoring occasion is after a first PDCCH monitoring occasion where the UE detects the earliest DCI format scheduling an initial transmission of a transport block after a power headroom report was triggered
or
the second PUSCH transmission is after the first uplink symbol of the first PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i, j, q_d, l) =$$
$$\tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i, l)\}[dB]$$

where $\tilde{P}_{CMAX,f,c}(i)$ is computed assuming MPR=0 dB, A-MPR=0 dB, P-MPR=0 dB. DTC=0 dB. MPR, A-MPR, P-MPR and DTC are defined in [8-1, TS 38.101-1], [8-2, TS 38.101-2] and [8-3, TS 38.101-3]. The remaining parameters are defined in clause 7.1.1 and, if ul-powerControl is not provided, $P_{O\_PUSCH,b,f,c}(j)$ and $\alpha_{b,f,c}(j)$ are obtained using $P_{O\_NOMINAL,PUSCH,f,c}(0)$ and p0-PUSCH-AlphaSetId=0, $PL_{b,f,c}(q_d)$ is obtained using pusch-PathlossReferenceRS-Id=0, and l=0. If ul-powerControl is provided, $P_{O\_PUSCH,b,f,c}(j)$, $\alpha_{b,f,c}(j)$ and l are obtained by p0AlphaSetforPUSCH associated with the indicated TCI-State or TCI-UL-State, $PL_{b,f,c}(q_d)$ is obtained by PL-RS associated with the indicated TCI-State or TCI-UL-State.

If a UE is configured with two UL carriers for a serving cell and the UE determines a Type 1 power headroom report for the serving cell based on a reference PUSCH transmission, the UE computes a Type 1 power headroom report for the serving cell assuming a reference PUSCH transmission on the UL carrier provided by pusch-Config. If the UE is provided pusch-Config for both UL carriers, the UE computes a Type 1 power headroom report for the serving cell assuming a reference PUSCH transmission on the UL carrier provided by pucch-Config. If pucch-Config is not provided to the UE for any of the two UL carriers, the UE computes a Type 1 power headroom report for the serving cell assuming a reference PUSCH transmission on the non-supplementary UL carrier.

If a UE is not provided twoPHRMode, and is provided two SRS resource sets in srs-ResourceSetToAddModList or srs-ResourceSetToAddModListDCI-0-2 with usage set to 'codebook' or 'nonCodebook' on active UL BWP b of carrier f of serving cell c, the UE provides one Type 1 power headroom report in a slot n. If the Type 1 power headroom report is for an actual PUSCH repetition, the Type 1 power headroom report is for the first PUSCH repetition associated with the first SRS resource set or the second SRS resource set that overlaps with slot n.

If a UE is provided twoPHRMode, and is provided two SRS resource sets in srs-ResourceSetToAddModList or srs-ResourceSetToAddModListDCI-0-2 with usage set to 'codebook' or 'nonCodebook' on active UL BWP b of carrier f of serving cell c, the UE provides two Type 1 power headroom reports in a slot n, where if the UE provides a first Type 1 power headroom report for an actual PUSCH repetition of a PUSCH transmission starting earliest in slot n that is associated with one SRS resource set, if the UE transmits PUSCH repetitions associated with the other SRS resource set in slot n, the UE provides a second Type 1 power headroom report for a first actual PUSCH repetition associated with the other SRS resource set that overlaps with slot n else, the UE provides a second Type 1 power headroom report for a reference PUSCH transmission associated with the other SRS resource set, where if the other SRS resource set is the first SRS resource set, $P_{O\_PUSCH,b,f,c}(j)$ and $\alpha_{b,f,c}(j)$ are obtained using $P_{O\_NOMINAL,PUSCH,f,c}(0)$ and p0-PUSCH-AlphaSetId=0, $PL_{b,f,c}(q_d)$ is obtained using pusch-PathlossReferenceRS-Id=0 if the UE is not provided enablePL-RS-UpdateForPUSCH-SRS or is obtained from PUSCH-PathlossReferenceRS-Id mapped to sri-PUSCH-PowerControlId=0 of sri-PUSCH-MappingToAddModList if the UE is provided enablePL-RS-UpdateForPUSCH-SRS, and l=0. If the UE is provided dl-OrJointTCI-StateList or TCI-UL-State that indicate a first TCI-State or TCI-UL-State and a second TCI-State or TCI-UL-State, the UE provides the second Type 1 power headroom report using the p0AlphaSetforPUSCH and pathlossReferenceRS-Id-r17 values associated with the first TCI-State or TCI-UL-State.

else, $P_{O\_PUSCH,b,f,c}(j)$ and $\alpha_{b,f,c}(j)$ are obtained using $P_{O\_NOMINAL,PUSCH,f,c}(0)$ and p0-PUSCH-AlphaSetId=1, $PL_{b,f,c}(q_d)$ is obtained using pusch-PathlossReferenceRS-Id=1 if the UE is not provided enablePL-RS-UpdateForPUSCH-SRS or is obtained from PUSCH-PathlossReferenceRS-Id mapped to sri-PUSCH-PowerControlId=0 of sri-PUSCH-MappingToAddModList2 if the UE is provided enablePL-RS-UpdateForPUSCH-SRS, and l=1 if the UE is provided twoPUSCH-PC-AdjustmentStates, or l=0 if the UE is not provided twoPUSCH-PC-AdjustmentStates. If the UE is provided dl-OrJointTCI-StateList or TCI-UL-State that indicate a first TCI-State or TCI-UL-State and a second TCI-State or TCI-UL-State, the UE provides the second Type 1 power headroom report using the p0AlphaSetforPUSCH and pathlossReferenceRS-Id-r17 values associated with the second TCI-State or TCI-UL-State.

else, if the UE provides a Type 1 power headroom report for a reference PUSCH transmission associated with the first SRS resource set, the UE provides a Type 1 power headroom report for a reference PUSCH transmission associated with the second SRS resource set, where for the first Type 1 power headroom report, $P_{O\_PUSCH,b,f,c}(j)$ and $\alpha_{b,f,c}(j)$ are obtained using $P_{O\_NOMINAL,PUSCH,f,c}(0)$ and p0-PUSCH-AlphaSetId=0, $PL_{b,f,c}(q_d)$ is obtained using pusch-PathlossReferenceRS-Id=0 if the UE is not provided enablePL-RS-UpdateForPUSCH-SRS, or is obtained from the PUSCH-PathlossReferenceRS-Id mapped to sri-PUSCH-PowerControlId=0 of sri-PUSCH-MappingToAddModList if the UE is provided enablePL-RS-UpdateForPUSCH-SRS, and l=0.

for the second Type 1 power headroom report, $P_{O\_PUSCH,b,f,c}(j)$ and $\alpha_{b,f,c}(j)$ are obtained using $P_{O\_NOMINAL,PUSCH,f,c}(0)$ and p0-PUSCH-AlphaSetId=1, $PL_{b,f,c}(q_d)$ is obtained using pusch-PathlossReferenceRS-Id=1 if the UE is not provided enablePL-RS-UpdateForPUSCH-SRS, or is obtained from the PUSCH-PathlossReferenceRS-Id mapped to sri-PUSCH-PowerControlId=0 of sri-PUSCH-MappingToAddModList2 if the UE is provided enablePL-RS-UpdateForPUSCH-SRS, and l=1 if the UE is provided twoPUSCH-PC-AdjustmentStates or l=0 if the UE is not provided twoPUSCH-PC-AdjustmentStates if a UE is provided dl-OrJointTCI-StateList or TCI-UL-State and is indicated a first TCI-State or TCI-UL-State and a second TCI-State or TCI-UL-State, the UE provides the first or the second Type 1 power headroom reports using the p0AlphaSetforPUSCH and pathlossReferenceRS-Id-r17 values associated with the first TCI-State or TCI-UL-State or with the second TCI-State or TCI-UL-State, respectively, if the reference PUSCH transmission is associated with the first TCI-State or TCI-UL-State or with the second TCI-State or TCI-UL-State, respectively If a UE is provided, for active UL BWP b of carrier f of serving cell c,
  twoPHRMode,
  two SRS resource sets in srs-ResourceSetToAddModList or srs-ResourceSetToAddModListDCI-0-2 with usage set to 'codebook' or 'nonCodebook',
  dl-OrJointTCI-StateList or TCI-UL-State and is indicated a first TCI-State or TCI-UL-State and a second TCI-State or TCI-UL-State, and
  multipanelScheme
the UE provides a Type 1 power headroom report and a configured maximum output power associated with the first TCI-State or TCI-UL-State for an actual PUSCH transmission using a spatial domain filter corresponding only to the first TCI-State or TCI-UL-State, a Type 1 power headroom report and a configured maximum output power associated with the second TCI-State or TCI-UL-State for an actual PUSCH transmission using a spatial domain filter corresponding only to the second TCI-State or TCI-UL-State, a first Type 1 power headroom report and a first configured maximum output power associated with the first TCI-State or TCI-UL-State, and a second Type 1 power headroom report and a second configured maximum output power associated with the second TCI-State or TCI-UL-State, for an actual PUSCH transmission using a spatial domain filter corresponding to the first TCI-State or TCI-UL-State and using a spatial domain filter corresponding to the second TCI-State or TCI-UL-State.

7.7.3 Type 3 PH Report

If a UE determines that a Type 3 power headroom report for an activated serving cell is based on an actual SRS transmission then, for SRS transmission occasion i on active UL BWP b of carrier f of serving cell c and if the UE is not configured for PUSCH transmissions on carrier f of serving cell c and the resource for the SRS transmission is provided by SRS-Resource, the UE computes a Type 3 power headroom report as $$PH_{type3b,f,c}(i, q_s) =$$
$$P_{CMAX,f,c}(i) - \{P_{O\_SRS,b,f,c}(q_s) + 10\log_{10}(2^\mu \cdot M_{SRS,b,f,c}(i)) +$$
$$\alpha_{SRS,b,f,c}(q_s) \cdot PL_{b,f,c}(q_d) + h_{b,f,c}(i)\}[dB]$$

where $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ are defined in clause 7.3.1 with corresponding values provided by SRS-ResourceSet.

If the UE determines that a Type 3 power headroom report for an activated serving cell is based on a reference SRS transmission then, for SRS transmission occasion i on UL BWP b of carrier f of serving cell c, and if the UE is not configured for PUSCH transmissions on UL BWP b of carrier f of serving cell c and a resource for the reference SRS transmission is provided by SRS-Resource, the UE computes a Type 3 power headroom report as $$PH_{type3,b,f,c}(i, q_s) =$$
$$\tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}[dB]$$

Where $q_s$ is an SRS resource set corresponding to SRS-ResourceSetId=0 for UL BWP b and $P_{O\_SRS,b,f,c}(q_s)$, $\alpha_{SRS,f,c}(q_s)$, $PL_{b,f,c}(q_d)$ and $h_{b,f,c}(i)$ are defined in clause 7.3.1 with corresponding values obtained from SRS-ResourceSetId=0 for UL BWP b. $\tilde{P}_{CMAX,f,c}(i)$ is computed assuming MPR=0 dB, A-MPR-0 dB, P-MPR=0 dB and DTC=0 dB. MPR, A-MPR, P-MPR and DTC are defined in [8-1, TS 38.101-1], [8-2, TS 38.101-2] and [8-3, TS 38.101-3].

If a UE is configured with two UL carriers for a serving cell and the UE determines a Type 3 power headroom report for the serving cell based on a reference SRS transmission and a resource for the reference SRS is provided by SRS-Resource, the UE computes a Type 3 power headroom report for the serving cell assuming a reference SRS transmission on the UL carrier provided by pucch-Config. If pucch-Config is not provided to the UE for any of the two UL carriers, the UE computes a Type 3 power headroom report for the serving cell assuming a reference SRS transmission on the non-supplementary UL carrier.

Figure 2:
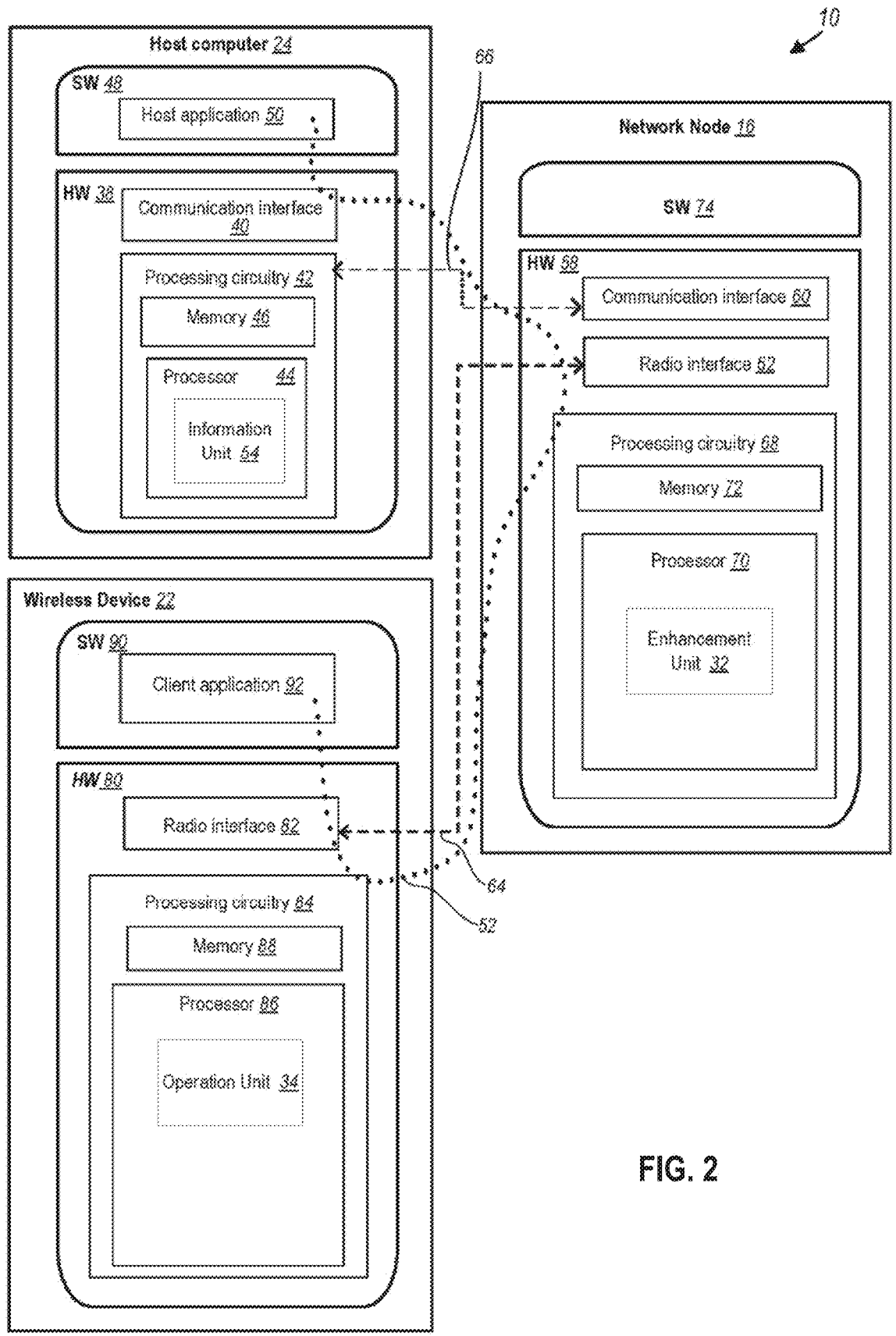
FIG. 2 is a block diagram of a host computer communicating via a network node with a wireless communications device over an at least partially wireless connection according to some embodiments.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless communications device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as enhancement unit 32, and operation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
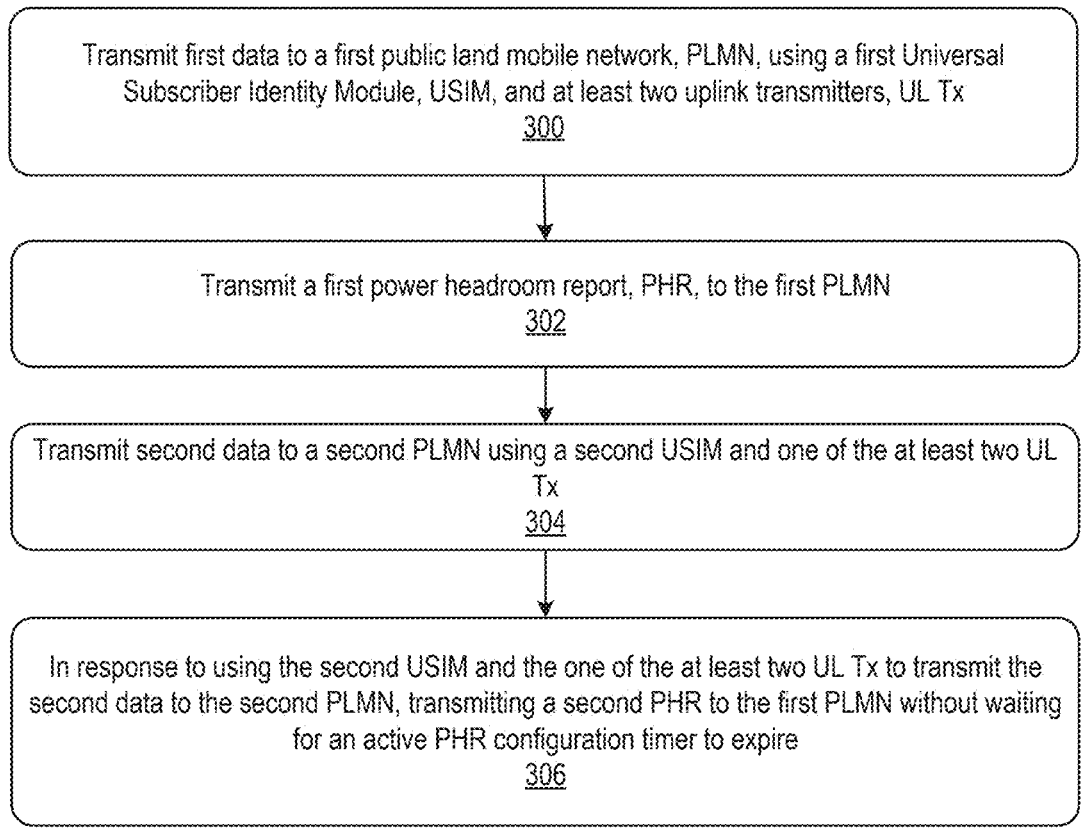
FIG. 3 is a flow chart illustrating operations of a UE according to some embodiments.

FIG. 3 is a flow chart illustrating operations of a UE according to some embodiments. As shown, some embodiments are directed to a method performed or implemented by a UE (e.g., a wireless communications device) for reporting PHR without waiting for a timer (e.g., an active or running PHR related timer) to expire. In some embodiments, the wireless communications device utilizes at least two Universal Subscriber Identity Modules, USIMs, and at least two uplink transmitters, UL Tx, and is configured to communicate with the first PLMN and a second PLMN.

In block 300, the method includes transmitting first data to the first PLMN using a first USIM of the at least two USIMs and the at least two UL Tx. In block 302, the method further includes transmitting a first PHR to the first PLMN. In block 304, the method further includes transmitting second data to the second PLMN using a second USIM of the at least two USIMs and one of the at least two UL Tx. In block 306, the method further includes in response to using the second USIM and the one of the at least two UL Tx to transmit the second data to the second PLMN, transmitting a second PHR to the first PLMN without waiting for an active PHR configuration timer to expire.

In some embodiments, the second PHR includes a power headroom value that is smaller than a power headroom value in the first PHR.

In some embodiments, the active PHR configuration timer is started after the first PHR is transmitted. For example, the UE may be configured to reset a prohibit timer and a periodic timer after each PHR is sent. In this example, unless one or more particular events occur (e.g., activating a second PLMN with a UL Tx previously allocated to a first PLMN), the UE may utilize the timers to avoid sending too many PHRs in a short period of time (which could negatively impact the network).

In some embodiments, the active PHR configuration timer includes a periodic timer and/or a prohibit timer.

In some embodiments, transmitting the second PHR (block 306) occurs without determining that a path loss change meets or exceeds a threshold value.

In some embodiments, transmitting the second PHR (block 306) occurs when an amount of time until the active PHR configuration timer expires meets or exceeds a threshold value.

In some embodiments, each of the first PHR and the second PHR includes a configured maximum output power (PC_max) value.

In some embodiments, the PC_max value in the second PHR is PCMAX_C_00 and a validity bit (v bit) in the second PHR is 1.

In some embodiments, the at least two UL Tx use UL-MIMO or Tx diversity; or wherein the wireless communications device is configured for dual connectivity communication with the first PLMN and/or the second PLMN; or wherein the wireless communications device is configured for carrier aggregation communication with the first PLMN and/or the second PLMN; or wherein the wireless communications device communicates with the first PLMN using a first UL Tx on a first UL carrier and a second UL Tx on a second UL carrier, and wherein the wireless communications device communicates with the second PLMN using at least one of the two UL Tx on the first UL carrier or on the second carrier.

In some embodiments, the second PHR includes a flag that indicates that the wireless communications device transmitted the second PHR without waiting for the active PHR configuration timer to expire.

In some embodiments, the wireless communications device is under one of a single carrier, a carrier aggregation, and a dual connectivity operation, and wherein the transmitting the second PHR to the first PLMN (block 306) comprises transmitting the second PHR in a subframe occurring after a subframe where the second PLMN is activated. In some embodiments, the subframe carrying the second PHR may directly follow the subframe where the second PLMN is activated or may be sometime later (e.g., when certain conditions are met like the next subframe carrying a PUSCH transmission after another condition is fulfilled).

Figure 4:
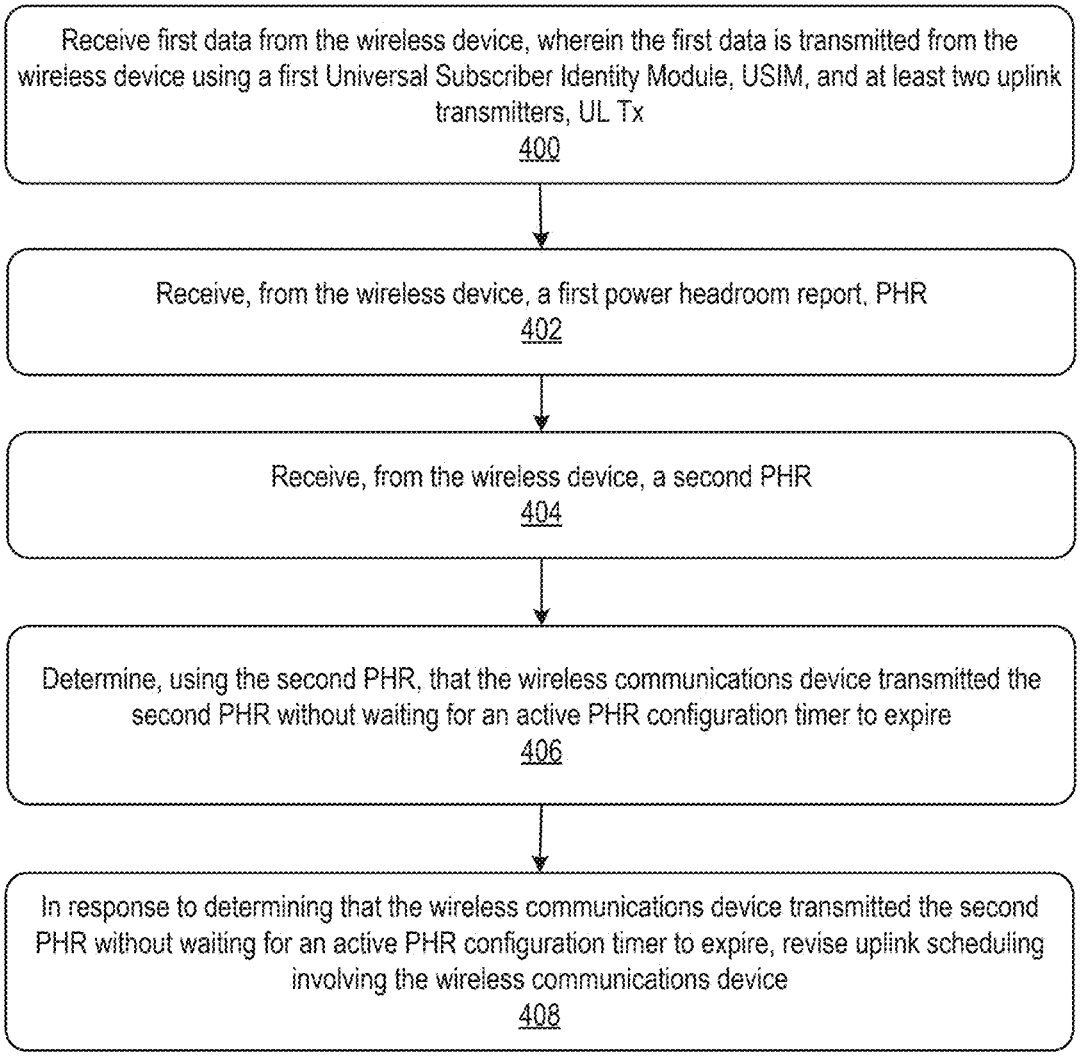
FIG. 4 is a flow chart illustrating operations of a network node according to some embodiments.

FIG. 4 is a flow chart illustrating operations of a network node according to some embodiments. As shown, some embodiments are directed to a method performed or implemented by a network node (e.g., a base station) that communicates with a wireless communications device, wherein the wireless communications device utilizes at least two Universal Subscriber Identity Modules, USIMs, and at least two uplink transmitters, UL Tx, and is configured to communicate with the first PLMN and a second PLMN and where the wireless communications device is configured to report a PHR without waiting for a timer (e.g., an active or running PHR configuration timer) to expire.

In some embodiments, a base station (BS) may generate and transmit PHR configuration parameters based on network conditions, power control strategies, and UE capabilities. For example, a BS (e.g., a gNB in 5G NR) may determine appropriate values for parameters such as phr-PeriodicTimer, phr-ProhibitTimer, and phr-Tx-PowerFactorChange to optimize uplink power management and ensure efficient scheduling of resources. These parameters are then sent to the UE via RRC signaling, specifically within the MAC-CellGroupConfig message. Upon receiving this configuration, the UE may follow the defined rules for periodic and event-triggered PHR reporting, allowing the network to monitor the UE's uplink power availability and adjust resource allocation accordingly. In some embodiments, the UE may transmit a PHR without waiting for PHR timer(s) to expire.

For example, a default BS configuration for PHR is shown below, where phr-PeriodicTimer is 100 ms, phr-Prohibit-Timer is 50 ms and the pathloss factor change phr-Tx-PowerFactorChange is 3 dB.

```
phr-Config setup:
    {
      phr-PeriodicTimer sf100,
      phr-ProhibitTimer sf50,
      phr-Tx-PowerFactorChange dB3,
      multiplePHR FALSE,
      dummy FALSE,
      phr-Type2OtherCell FALSE,
      phr-ModeOtherCG real},
    },
```

In some embodiments, a BS may be configured to handle PHR reporting in accordance with aspects described herein. For example, when the UE reports the PHR in a subframe after a second PLMN is activated and both phr-PeriodicTimer and phr-ProhibitTimer are not expired, the BS may know both timers are not expired and, as such, may determine that the received PHR indicates a special condition to stop scheduling data immediately on a second carrier when it's under CA/DC condition. In another example, when the UE reports the PHR in a subframe after a second PLMN is activated when the phr-PeriodicTimer is still active/running but the phr-ProhibitTimer is expired and regardless of a pathloss change condition being fulfilled, the BS may determine that the received PHR comprising a second PC_Max value of PCMAX_C_00 and a v bit of 1 indicates a special condition and, in response, may act as if the pathloss change condition was fulfilled, e.g., by reducing or stopping scheduling data for a first PLMN. In another example, when the UE reports the PHR in a subframe after a second PLMN is activated when the phr-PeriodicTimer is still active/running but the phr-ProhibitTimer is expired and regardless of whether a required power backoff condition is fulfilled (e.g., due to a measured Power Management Power Reduction (P-MPR) changing more than the phr-Tx-PowerFactor-Change value), the BS may determine that the received PHR comprising a second PC_Max value of PCMAX_C_00 and a v bit of 1 indicates a special condition and, in response, may act as if the power backoff condition was fulfilled, e.g., by reducing or stopping scheduling data for a first PLMN.

In some embodiments, a BS configured to receive "early" PHR reporting as a special condition and respond to these PHR by reducing or stopping scheduling data can save resources, e.g., by not having to wait for an active PHR configuration timer to expire from the UE side before receiving and/or acting in response to the PHR.

In block 400, the method includes receiving first data from the wireless communications device, wherein the first data is transmitted from the wireless communications device using a first USIM and the at least two UL Tx. In block 402, the method further includes receiving, from the wireless communications device, a first PHR. In block 404, the method further includes receiving, from the wireless communications device, a second PHR. In block 406, the method further includes determining, using the second PHR, that the wireless communications device transmitted the second PHR without waiting for an active PHR configuration timer to expire. In block 408, the method further includes in response to determining that the wireless communications device transmitted the second PHR without waiting for an active PHR configuration timer to expire, revising uplink scheduling involving the wireless communications device.

In some embodiments, determining (block 406) that the wireless communications device transmitted the second PHR without waiting for an active PHR configuration timer to expire includes determining that the active PHR configuration timer has yet to expire.

In some embodiments, the active PHR configuration timer includes a periodic timer and/or a prohibit timer.

In some embodiments, determining (block 406) that the wireless communications device transmitted the second PHR without waiting for an active PHR configuration timer to expire includes determining that both the periodic timer and the prohibit timer have yet to expire.

In some embodiments, determining (block 406) that the wireless communications device transmitted the second PHR without waiting for an active PHR configuration timer to expire includes determining that the periodic timer has yet to expire and the prohibit timer has expired.

In some embodiments, determining (block 406) that the wireless communications device transmitted the second PHR without waiting for an active PHR configuration timer to expire includes detecting a flag in the second PHR, wherein the flag indicates that the wireless communications device transmitted the second PHR without waiting for the active PHR configuration timer to expire.

In some embodiments, determining (block 406) that the wireless communications device transmitted the second PHR without waiting for an active PHR configuration timer to expire occurs regardless of a path loss change trigger event or a power backoff trigger event occurring.

Figure 5:
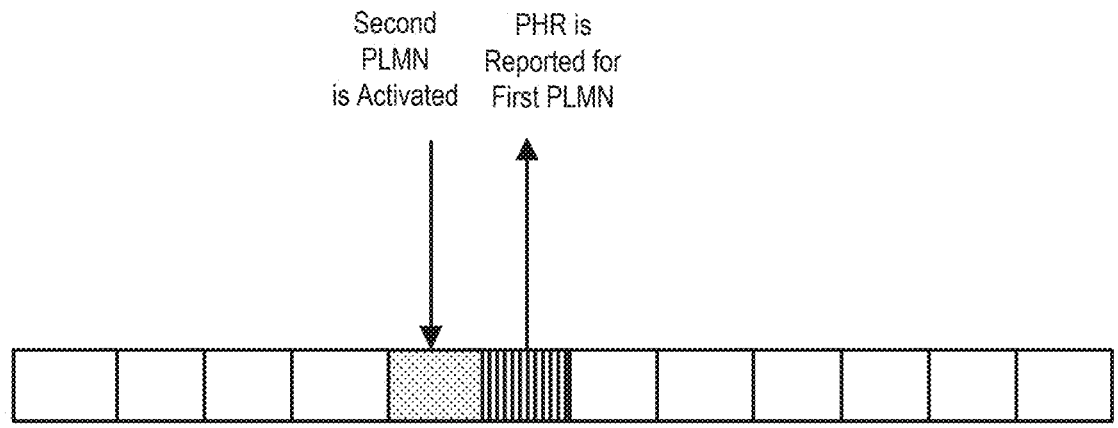
FIG. 5 illustrates PHR reporting to the first PLMN in a subframe directly following a subframe in which the second PLMN is activated according to some embodiments.

FIG. 5 illustrates PHR reporting to the first PLMN in a subframe directly following a subframe in which the second PLMN is activated according to some embodiments. In some embodiments, as represented by FIG. 5, the UE may transmit or report a PHR for the first PLMN immediately (e.g., in the next subframe) after a subframe where a second PLMN is activated. In some embodiments, the UE may transmit or report a PHR for the first PLMN without waiting for any timer to expire but may take into consideration the PHR configuration sent by BS and received by the UE.

In some embodiments, the UE may transmit or report a PHR by considering whether a PHR configuration timer is about to expire and may use a threshold value (e.g., 15 ms) for determining whether to wait or to go ahead. For example, if a phr-PeriodicTimer or a phr-ProhibitTimer is about to expire in 10 ms or less, the UE may wait until the timer expires (e.g., as defined by the 3GPP standard, such as 3GPP TS 38.321, v18.4.0) to report the PHR. However, in this example, if the amount of time before the timer expires is a longer period than the threshold value, the UE may report the PHR without waiting for the timer to expire to prevent or reduce the scheduling data sent from the BS.

There are two primary methods for reporting PHRs. The first method involves scheduled PUSCH reporting, where the UE receives DCI format 0-0 or 0-1 to confirm the scheduled PUSCH transmission, and the PHR is included in the MAC entity and transmitted via PUSCH. The second method is based on a reference format, where PHR is transmitted using higher-layer signaling of configured grants and periodic or semi-persistent SRS transmissions. If the PHR is reported on PUSCH using a configured grant, the UE receives the configured grant via downlink control information.

In 3GPP TS 38.321, v18.4.0, the following condition is defined to allow PHR reporting via PUSCH:

Condition for Reporting PHR in PUSCH

"A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format scheduling an initial transmission of a transport block since a power headroom report was triggered if the power headroom report is reported on a PUSCH triggered by the first DCI format. Otherwise, a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the power headroom report is reported on the PUSCH using the configured grant."

Figure 6:
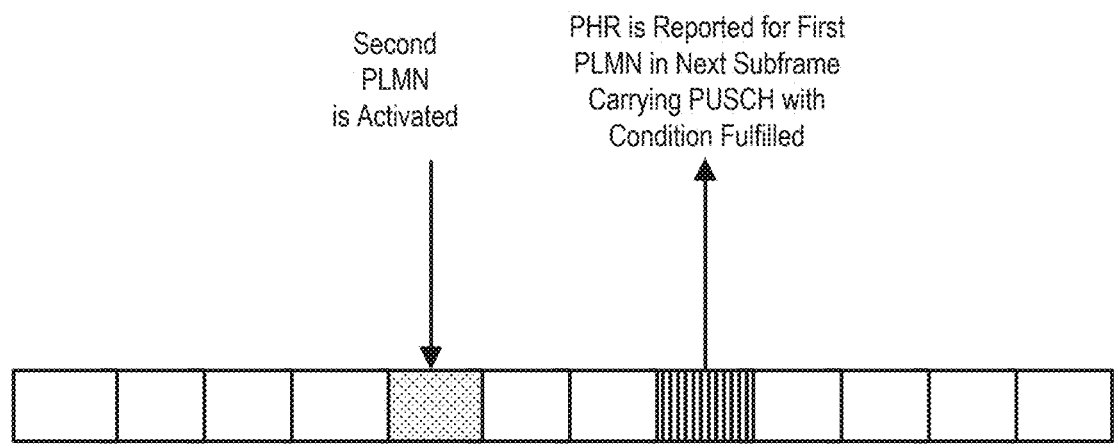
FIG. 6 illustrates PHR reporting to the first PLMN in a subframe carrying a PUSCH transmission when a condition is fulfilled after the second PLMN is activated according to some embodiments.

FIG. 6 illustrates PHR reporting to the first PLMN in a subframe carrying a PUSCH transmission when a condition is fulfilled after the second PLMN is activated according to some embodiments. In some embodiments, as represented by FIG. 6, after activating a second PLMN with RRC_Connected mode using one of the UE's multiple UL Tx for UL feedback for the second PLMN, the UE may transmit or report a PHR for the first PLMN, in the first subframe which carries a PUSCH with a condition fulfilled where such condition is allowed by the 3GPP standard (e.g., as defined by 3GPP TS 38.321, v18.4.0) to report PHR. In such embodiments, the PHR carrying subframe occurs after the subframe where the second PLMN is activated.

Having generally described arrangements for PHR for MUSIM, additional details for these arrangements, functions, and processes are provided as follows, and which may be implemented by the network node 16, wireless communications device 22, host computer 24, and/or other computing device.

Various UE embodiments associated with providing a PHR (e.g., without waiting for active PHR timers to expire) in MUSIM related scenarios are described below.

In some embodiments, the UE is capable of MUSIM with multiple PLMNs where a USIM is associated to at least one PLMN the UE is associated with. Thus, the UE may have a plurality of K USIM(s), wherein each of the USIM(s) is associated to at least one PLMN, so that communicating by a USIM may be equivalent as communicating to the (at least one) PLMN the USIM is associated with.

In some embodiments, the UE is capable of UE architecture as Dual-RX/Dual-TX, which means there are at least two independent Rx receiver chains are supported by the UE of DL data receptions and there are at least two independent Tx transmitter chains are supported by the UE of UL data transmissions. However, the PHR reporting methods and related aspects described herein may also be applicable for UEs with more than two transmitters and/or receivers as Multi-Rx/Multi-Tx UE architecture.

In some embodiments, the UE architecture as Dual-Rx/Dual-Tx may refer to Dual Rx antenna ports and Dual Tx antenna ports so at least two Rx antenna ports and at least two Tx antenna ports are supported. However, the PHR reporting methods and related aspects described herein may also be applicable for UEs with more than 2 Tx antenna ports and/or Rx antenna ports as Multi-Rx/Multi-Tx UE architecture.

In some embodiments, the UE is capable of NR SA (with CA) or NR DC or LTE CA on at least one of the USIM associated with at least one PLMN. Some embodiments below may describe a UE using Dual Connectivity in one network. However, the solutions are equally applicable for UEs using Carrier Aggregation. PHR reporting methods and related aspects described herein may also be applicable for UEs using DC or CA in two or more networks when the UE has more than 2 transmitters and/or receivers.

In some embodiments, the UE is capable of transmitting by both dual Tx on a first PLMN and the UE is not capable of transmitting by both dual Tx on a second PLMN.

In some embodiments, the UE is capable of NR SA (with CA) or NR DC on a first PLMN with Dual Tx and the UE is not capable of NR SA (with CA) or NR DC on the second PLMN.

In some embodiments, the UE is capable of LTE CA on a first PLMN with Dual Tx and the UE is not capable of NR SA (with CA) or NR DC on the second PLMN.

In some embodiments, the UE is capable of NR SA (with CA) or NR DC on a first PLMN with Dual Tx and the UE is not capable of LTE CA on the second PLMN.

In some embodiments, the UE is capable of LTE CA on a first PLMN with Dual Tx and the UE is not capable of LTE CA on the second PLMN.

In some embodiments, the UE is capable of UL-MIMO on a first PLMN with Dual Tx and the UE is not capable of UL-MIMO on the second PLMN.

In some embodiments, the UE is capable of UL Tx diversity on a first PLMN with Dual Tx and the UE is not capable of UL Tx diversity on the second PLMN.

PHR for MPE P-MPR

The PHR is defined in 3GPP TS 38.321 [1] as following, which includes the MPE P-MPR as the indication of the power backoff to meet the MPE FR2 requirements.

5.4.6 Power Headroom Reporting

The Power Headroom reporting procedure is used to provide the serving gNB with the following information:

- Type 1 power headroom: the difference between the nominal UE maximum transmit power and the estimated power for UL-SCH transmission per activated Serving Cell;
- Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
- Type 3 power headroom: the difference between the nominal UE maximum transmit power and the estimated power for SRS transmission per activated Serving Cell;
- MPE P-MPR: the power backoff to meet the MPE FR2 requirements for a Serving Cell operating on FR2;
- DPC: the adjustment to maximum output power for a given power class for a Serving Cell operating on FR1;
- $DPC_{BC}$: the adjustment to maximum output power for a given power class for a Band Combination operating on FR1.

RRC controls Power Headroom reporting by configuring the following parameters:

dpc-Reporting-FR1;
phr-AssumedPUSCH-Reporting;

phr-PeriodicTimer;
phr-ProhibitTimer;
phr-Tx-PowerFactorChange;
phr-Type2OtherCell;
phr-ModeOtherCG;
multiplePHR;
mpe-Reporting-FR2;
mpe-ProhibitTimer;
mpe-Threshold;
numberOfN;
mpe-ResourcePoolToAddModList;
twoPHRMode.

A Power Headroom Report (PHR) shall be triggered if any of the following events occur:

phr-ProhibitTimer expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].

phr-PeriodicTimer expires;
upon configuration or reconfiguration of the power headroom reporting functionality by upper layers, which is not used to disable the function;
activation of an SCell of any MAC entity with configured uplink of which firstActiveDownlinkBWP-Id is not set to dormant BWP;
activation of an SCG;
addition of the PSCell except if the SCG is deactivated (i.e. PSCell is newly added or changed);
phr-ProhibitTimer expires or has expired, when the MAC entity has UL resources for new transmission, and the following is true for any of the activated Serving Cells of any MAC entity with configured uplink:
there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink;
if dpc-Reporting-FR1 is configured, $\Delta P_{PowerClass}$/$\Delta P_{PowerClass, CA}$/$\Delta P_{PowerClass, EN-DC}$/$\Delta P_{PowerClass, NR-DC}$ reporting is triggered upon uplink duty cycle exceedance or upon return to the power class after the duty cycle exceedance, as specified in TS 38.101-1 [14] and TS 38.101-3 [16]).
if mpe-Reporting-FR2 is configured, and mpe-ProhibitTimer is not running:
the measured P-MPR applied to meet FR2 MPE requirements as specified in TS 38.101-2 [15] is equal to or larger than mpe-Threshold for at least one activated FR2 Serving Cell since the last transmission of a PHR in this MAC entity; or
the measured P-MPR applied to meet FR2 MPE requirements as specified in TS 38.101-2 [15] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.

in which case the PHR is referred below to as 'MPE P-MPR report'.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

NOTE 3: If a HARQ process is configured with cg-RetransmissionTimer and if the PHR is already included in a MAC PDU for transmission on configured grant by this HARQ process, but not yet transmitted by lower layers, it is up to UE implementation how to handle the PHR content.

. . . .

2> if this PHR report is an MPE P-MPR report:
3> start or restart the mpe-ProhibitTimer;
3> cancel triggered MPE P-MPR reporting for Serving Cells included in the PHR MAC CE.
2> start or restart phr-Periodic Timer;
2> start or restart phr-ProhibitTimer;
2> cancel all triggered PHR(s).

All triggered PHRs shall be cancelled when there is an ongoing SDT procedure as in clause 5.27 and the UL grant(s) can accommodate all pending data available for transmission but is not sufficient to additionally accommodate the PHR MAC CE plus its subheader.

MAC Entry for Reporting PHR

The MAC entry for reporting PHR which includes the Pc_max, P and P-MPR defined as following as for example for single entry from 3GPP TS 38.321 [1].

6.1.3.8 Single Entry PHR MAC CE

The Single Entry PHR MAC CE is identified by a MAC subheader with LCID as specified in Table 6.2.1-2.

It has a fixed size and consists of two octets defined as follows (FIG. 6.1.3.8-1):

R: Reserved bit, set to 0;
Power Headroom (PH): This field indicates the power headroom level. The length of the field is 6 bits. The reported PH and the corresponding power headroom levels are shown in Table 6.1.3.8-1 below (the corresponding measured values in dB are specified in TS 38.133 [11]);
P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR, as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]);

- MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits or DPC is present instead;
- DPC: If dpc-Reporting-FR1 is configured, and the Serving Cell operates on FR1, this field indicates the $\Delta P_{PowerClass}$, as specified in TS 38.101-1 [14] and TS 38.101-3 [16]. If dpc-Reporting-FR1 is not configured and the Serving Cell operates on FR1, R bits are present instead. This field indicates an index to Table 6.1.3.8-4 and the corresponding measured values of DPC levels in dB are specified in TS 38.133 [11], the DPC field is set to 0 if the criteria to report DPC is not met. The length of the field is 2 bits. If the Serving Cell operates on FR2, R bits or MPE is present instead.

FIG. 6.1.3.8-1: Single Entry PHR MAC CE

| | | |
|---|---|---|
| P | R | PH (Type 1, PCell) |
| MPE or DPC or R | | $PC_{MAX,f,c}$ |

Scenarios for Single Carrier Operation on First PLMN

Figure 7:
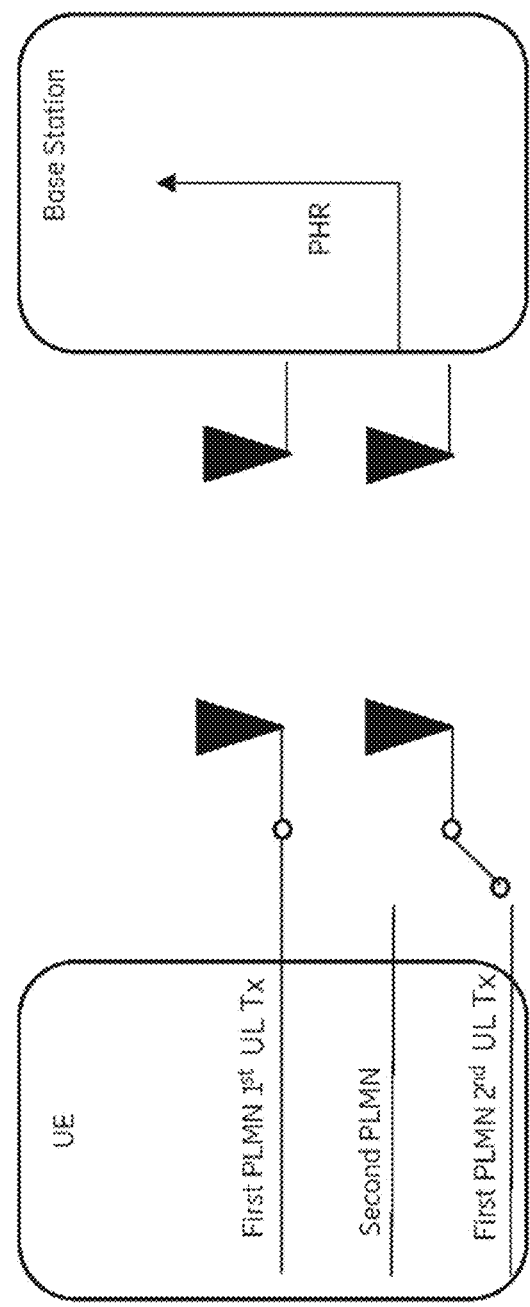
FIG. 7 illustrates single carrier operation for the first PLMN according to some embodiments.

FIG. 7 illustrates single carrier operation for the first PLMN. In FIG. 7, the first PLMN is using single carrier operation to communicate with the UE, where the UE architecture use Dual-Rx/Dual-Tx. Where 2 Tx antenna ports supporting 2 UL Tx, the uplink transmission can apply UL-MIMO or UL Tx diversity with antenna switching scheme. Other UE architectures using more than one Tx chain/Tx transceiver is also within the scope of the embodiments, where more than one Tx antenna port is used for transmitting uplink signals/data to the gNB. Generally, when a PHR is triggered, under the conditions defined in 3GPP TS 38.321, there is at least one of the parameters, e.g., PC_Max, reported for the first PLMN, according to the Tables 6.1.3.8-1-3. When both 2 UL Tx are used by the first PLMN the PC_Max is reported as a first PC_max. Once one of the Tx is used by the second PLMN, the PC_Max is reported as a second PC_max which will indicate a power reduction compared to the first PC_max. Further, in the embodiment when the 2 UL Tx are used by both the first PLMN and the second PLMN, the PC_Max is reported as a first PC_max. Once both 2 UL Tx are used by the first PLMN again the PC_Max is reported as a second PC_max, which will indicate a power increase compared to the first PC_max.

In some embodiments, when the UE is under single carrier operation and communicating with the first PLMN with at least 2 UL Tx, when the triggering condition for reporting PHR is fulfilled, the PHR is be reported as defined in 3GPP TS 38.321, where the PHR includes a PC_Max value, as is the standardized procedure. In some embodiments, when the UE is activated with the second PLMN with at least one UL Tx, the PHR is triggered to report in the first PLMN without waiting for a timer (e.g., a phr-PeriodicTimer and/or a phr-ProhibitTimer) to expire, where a second PC_Max value is reported.

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $PC_{MAX,f,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

TABLE 6.1.3.8-3

Effective power reduction for MPE P-MPR

| MPE | Measured P-MPR value |
|---|---|
| 0 | P-MPR_00 |
| 1 | P-MPR_01 |
| 2 | P-MPR_02 |
| 3 | P-MPR_03 |

TABLE 6.1.3.8-4

Delta power class for DPC

| DPC | Measured DPC value |
|---|---|
| 0 | Reserved |
| 1 | DPC_00 |
| 2 | DPC_03 |
| 3 | DPC_06 |

In some embodiments, the power reduction is for the second PC_max. The second PC_max is reported as PCMAX_C being one value higher, as an example. Once the higher PCMax_C is received in the PHR for the specific carrier, the gNB schedules data assuming less power is available.

TABLE 1

Reported PC_MAX values

| Reported value | Measured quantity value | Unit |
|---|---|---|
| PCMAX_C_00 | $P_{CMAX,c,f} < -29$ | dBm |
| PCMAX_C_01 | $-29 \le P_{CMAX,c,f} < -28$ | dBm |
| PCMAX_C_02 | $-28 \le P_{CMAX,c,f} < -27$ | dBm |
| ... | ... | ... |
| PCMAX_C_61 | $31 \le P_{CMAX,c,f} < 32$ | dBm |
| PCMAX_C_62 | $32 \le P_{CMAX,c,f} < 33$ | dBm |
| PCMAX_C_63 | $33 \le P_{CMAX,c,f}$ | dBm |

Scenarios for CA or DC Operation on First PLMN

Figure 8:
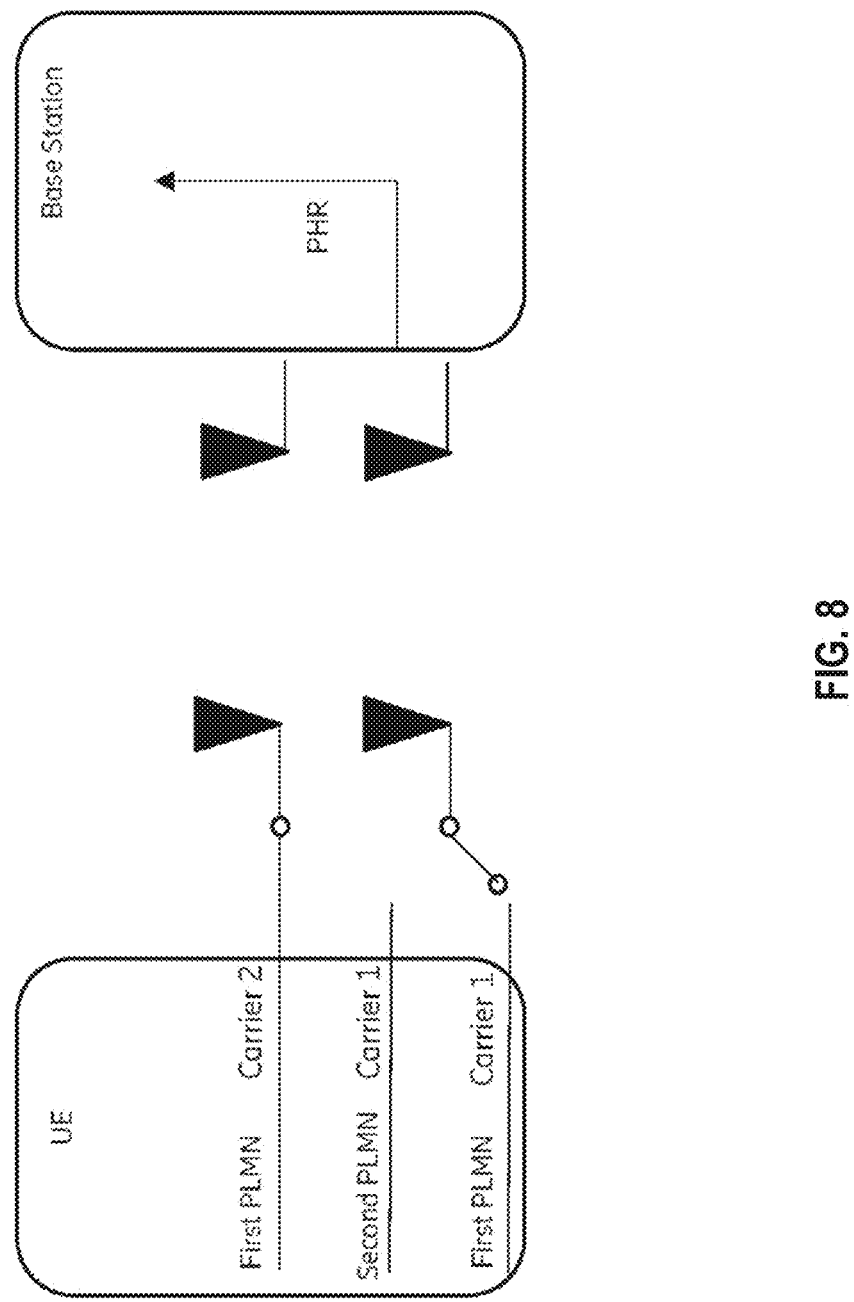
FIG. 8 illustrates CA/DC with multiple carrier operation for the first PLMN according to some embodiments.

FIG. 8 illustrates CA/DC with multiple carrier operation for the first PLMN. When the first PLMN is using CA/DC operation to communicate with a UE having a UE architecture including more than one Tx chain/Tx transceiver such as a Dual-Rx/Dual-Tx, more than one Tx antenna port can be used for transmitting uplink signals/data to the gNB. For example, for an uplink transmission using 2 Tx antenna ports supporting 2 UL Tx, the uplink transmission can be applied on multiple UL carriers. When the PHR is triggered, under the conditions defined in 3GPP TS 38.321, there is at least one of the parameters, e.g., PC_Max, reported in the tables below with multiple entries. When both 2 UL Tx are used by the first PLMN with multiple UL carriers the PC_Max is reported as a first PC_max. Once one of the Tx is used by the second PLMN, the PC_Max is reported as a second PC_max which indicate a power reduction compared to the first PC_max. Further, when 2 UL Tx are used by both the first PLMN and the second PLMN, the PC_Max is reported as a first PC_max. Once both 2 UL Tx are used by the first PLMN again for multiple UL carriers the PC_Max is reported as a second PC_max which will indicate a power increase compared to the first PC_max.

In some embodiments, when the UE is under CA/DC operation and communicating with the first PLMN with at least 2 UL Tx supporting different frequency carriers, when the triggering condition for reporting PHR is fulfilled, the PHR is be reported as defined in 3GPP TS 38.321, where the PHR includes a PC_Max value, as is the standardized procedure. In some embodiments, when the UE is activated with the second PLMN with at least one UL Tx, the PHR is triggered to report in the first PLMN without waiting for a timer (e.g., a phr-Periodic Timer and or a phr-ProhibitTimer) to expire, where a second PC_Max value is reported.

6.1.3.9 Multiple Entry PHR MAC CE

The Multiple Entry PHR MAC CE is identified by a MAC subheader with LCID as specified in Table 6.2.1-2.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type 2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

$C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

$DPC_{BC}$: If dpc-Reporting-FR1 is configured and at least one DPC field is not set to 0, this field indicates the $\Delta P_{PowerClass}$, $_{CA}/\Delta P_{PowerClass}$, $_{EN-DC}/\Delta P_{PowerClass, NR-DC}$, as specified in TS 38.101-1 [14] and TS 38.101-3 [16]. This field set to 0 indicates the delta power class for band combination is 0 dB and this field set to 1 indicates the delta power class for band combination is same or larger than 3 dB. Otherwise, R bit is present, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE or DPC field, and the V field set to 1 indicates that the octet containing the associated $P_{CMAX,f,c}$ field and the MPE or DPC field is omitted;

Power Headroom (PH): This field indicates the power headroom level. The length of the field is 6 bits. The reported PH and the corresponding power headroom levels are shown in Table 6.1.3.8-1 (the corresponding measured values in dB for the NR Serving Cell are specified in TS 38.133 [11] while the corresponding measured values in dB for the E-UTRA Serving Cell are specified in TS 36.133 [12]);

A—P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR, as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 [11] while the corresponding measured values in dBm for the E-UTRA Serving Cell are specified in TS 36.133 [12]);

MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits or DPC is present instead.

DPC: If dpc-Reporting-FR1 is configured, and the Serving Cell operates on FR1, this field indicates the $\Delta P_{PowerClass}$, as specified in TS 38.101-1 [14] and TS 38.101-3 [16]. If dpc-Reporting-FR1 is not configured and the Serving Cell operates on FR1, R bits are present instead. This field indicates an index to Table 6.1.3.8-4 and the corresponding measured values of DPC levels in dB are specified in TS 38.133 [11]. The DPC field is set to 0 if the criteria to report DPC is not met. The length of the field is 2 bits. If the Serving Cell operates on FR2, R bits or MPE is present instead.

FIG. 9 shows Multiple Entry PHR MAC CE with the highest ServCellIndex of Serving Cell with configured uplink is less than 8 (a) and Multiple Entry PHR MAC CE with the highest ServCellIndex of Serving Cell with configured uplink is equal to or higher than 8 (b).

In some embodiments, one aim for transmitting a PHR after activating a second PLMN is to apply the power reduction for one of the entries (carriers) or set its PH to minimum. For example, the PCMAX_C not included for a virtual transmission, V="1"). In this case, the UE includes V=1 for the serving cell and set its PH to the POWER_HEADROOM_0 (PH<−32 dB) or any indication with PH<0 which also indicates that the UE power is not sufficient for scheduling the UL grant.

In some embodiments, the power reduction is for the second PC_max. The second PC_max is reported as PCMAX_C_00. Once received PC_MAX_C_00 is received in PHR for the specific carrier, gNB stops scheduling data on the carrier assuming that there is not sufficient power available.

TABLE 2

Reported PC_MAX values

| Reported value | Measured quantity value | Unit |
| --- | --- | --- |
| PCMAX_C_00 | $P_{CMAX,c,f} < -29$ | dBm |
| PCMAX_C_01 | $-29 \leq P_{CMAX,c,f} < -28$ | dBm |
| PCMAX_C_02 | $-28 \leq P_{CMAX,c,f} < -27$ | dBm |
| ... | ... | ... |
| PCMAX_C_61 | $31 \leq P_{CMAX,c,f} < 32$ | dBm |
| PCMAX_C_62 | $32 \leq P_{CMAX,c,f} < 33$ | dBm |
| PCMAX_C_63 | $33 \leq P_{CMAX,c,f}$ | dBm |

Although computing devices described herein (e.g., UEs, wireless communications devices, network nodes) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Abbreviations that may be used in the preceding description include:

| Abbreviation | Explanation |
| --- | --- |
| PHR | Power Headroom Reporting |
| USIM | Universal Subscriber Identity Module (SIM), e.g., a physical SIM card or an embedded SIM (eSIM) |
| MUSIM | Multiple USIMs |
| PLMN | Public Land Mobile Network |
| MAC | Media Access Control |
| CE | Control Element |
| MPR | Allowed maximum power reduction |
| MPE | Maximum Permissible Exposure |
| EN-DC | E-UTRA NR Dual Connectivity with E-UTRA connected to EPC |
| SRS | Sounding Reference Signal |
| UE | User Equipment |
| UL | Uplink |
| RRC | Radio Resource Control |
| MR-DC | Multi-Radio Dual Connectivity |
| MPE P-MPR | The power backoff to meet the MPE FR2 requirements for a Serving Cell operating on FR2 |
| P-MPR | Power Management Maximum Power Reduction |
| BWP | Bandwidth Part |
| PDCCH | Physical Downlink Control Channel |
| PRACH | Physical Random Access Channel |
| PUSCH | Physical Uplink Shared Access Channel |
| PUCCH | Physical Uplink Control Channel |
| MIMO | Multiple Input Multiple Output |
| HARQ | Hybrid Automatic Repeat Request |
| DCI | Downlink Control Information |
| DAI | Downlink Assignment Indicator |
| CCE | Control Channel Element |
| CBG | Code Block Group |
| DC | Dual Connectivity |
| CA | Carrier Aggregation |
| DSDS | Dual SIM Dual Standby |
| DSDA | Dual SIM Dual Active |
| NACK | Not-acknowledgment |
| TB | Transport Block |
| UCI | Uplink Control Information |
| SRS | Sounding Reference Signal |

What is claimed is:

1. A method implemented by a wireless communications device utilizing at least two Universal Subscriber Identity Modules, USIMs, and at least two uplink transmitters, UL Tx, and configured to communicate with a first public mobile network, PLMN, and a second PLMN, the method comprising:
   transmitting first data to the first PLMN using a first USIM of the at least two USIMs and the at least two UL Tx;
   transmitting a first power headroom report, PHR, to the first PLMN;
   transmitting second data to the second PLMN using a second USIM of the at least two USIMs and one of the at least two UL Tx; and
   in response to using the second USIM and the one of the at least two UL Tx to transmit the second data to the second PLMN, transmitting a second PHR to the first PLMN without waiting for an active PHR configuration timer to expire.

2. The method of claim 1, wherein the second PHR comprises a power headroom value that is smaller than a power headroom value in the first PHR.

3. The method of claim 1, wherein the active PHR configuration timer is started after the first PHR is transmitted.

4. The method of claim 1, wherein the active PHR configuration timer is a periodic timer and/or a prohibit timer.

5. The method of claim 1, wherein transmitting the second PHR occurs without determining that a path loss change meets or exceeds a threshold value.

6. The method of claim 1, wherein transmitting the second PHR occurs when an amount of time until the active PHR configuration timer expires meets or exceeds a threshold value.

7. The method of claim 1, wherein each of the first PHR and the second PHR comprises a configured maximum output power, PC_max, value.

8. The method of claim 7, wherein the PC_max value in the second PHR is PCMAX_C_00, and a validity bit, v bit, comprised in the second PHR is 1.

9. The method of claim 1, wherein each of the first PHR and the second PHR comprise a power headroom, PH, level.

10. The method of claim 9, wherein the PH level comprised in the second PHR is 0.

11. The method of claim 1, wherein the at least two UL Tx use UL-MIMO or Tx diversity; or
   wherein the wireless communications device is configured for dual connectivity communication with the first PLMN and/or the second PLMN; or
   wherein the wireless communications device is configured for carrier aggregation communication with the first PLMN and/or the second PLMN; or
   wherein the wireless communications device communicates with the first PLMN using a first UL Tx on a first UL carrier and a second UL Tx on a second UL carrier, and wherein the wireless communications device communicates with the second PLMN using at least one of the two UL Tx on the first UL carrier or on the second carrier.

12. The method of claim 1, wherein the second PHR comprises a flag that indicates that the wireless communications device transmitted the second PHR without waiting for the active PHR configuration timer to expire.

13. The method of claim 1, wherein the wireless communications device is under one of a single carrier, a carrier aggregation, and a dual connectivity, operation, and wherein the transmitting the second PHR to the first PLMN comprises transmitting the second PHR in a subframe occurring after a subframe where the second PLMN is activated.

14. A wireless communications device configured to utilize at least two Universal Subscriber Identity Modules, USIMs, and at least two uplink transmitters, UL Tx, and configured to communicate with a first public mobile network, PLMN, and a second PLMN, the wireless communications device comprising processing circuitry configured to cause the wireless communications device to become operative to:
   transmit first data to the first PLMN using a first USIM of the at least two USIMs and the at least two UL Tx;
   transmit a first power headroom report, PHR, to the first PLMN;
   transmit second data to the second PLMN using a second USIM of the at least two USIMs and one of the at least two UL Tx; and
   in response to using the second USIM and the one of the at least two UL Tx to transmit the second data to the second PLMN, transmit a second PHR to the first PLMN without waiting for an active PHR configuration timer to expire.

15. The wireless communications device of claim 14, wherein the second PHR comprises a power headroom value that is smaller than a power headroom value in the first PHR.

16. The wireless communications device of claim 14, wherein the wireless communications device is further operative to start the active PHR configuration timer after the first PHR is transmitted.

17. The wireless communications device claim 14, wherein the active PHR configuration timer is a periodic timer and/or a prohibit timer.

18. The wireless communications device of claim 14, wherein the wireless communications device is operative to transmit the second PHR without determining that a path loss change meets or exceeds a threshold value.

19. The wireless communications device of claim 14, wherein the wireless communications device is operative to transmit the second PHR when an amount of time until the active PHR configuration timer expires meets or exceeds a threshold value.

20. The wireless communications device of claim 14, wherein each of the first PHR and the second PHR comprises a configured maximum output power, PC_max, value.

21. The wireless communications device of claim 20, wherein the PC_max value in the second PHR is PCMAX_C_00, and a validity bit, v bit, comprised in the second PHR is 1.

22. The wireless communications device of claim 14, wherein each of the first PHR and the second PHR comprises a power headroom, PH, level.

23. The wireless communications device of claim 22, wherein the PH level comprised in the second PHR is 0.

24. The wireless communications device of claim 14, wherein the at least two UL Tx are configured for UL-MIMO or Tx diversity; or
    wherein the wireless communications device is configured for dual connectivity communication with the first PLMN and/or the second PLMN; or
    wherein the wireless communications device is configured for carrier aggregation communication with the first PLMN and/or the second PLMN; or
    wherein the wireless communications device is configured for communication with the first PLMN using a first UL Tx on a first UL carrier and a second UL Tx on a second UL carrier, and wherein the wireless communications device is configured for communication with the second PLMN using at least one of the two UL Tx on the first UL carrier or on the second UL carrier.

25. The wireless communications device of claim 14, wherein the second PHR comprises a flag that indicates that the wireless communications device transmitted the second PHR without waiting for the active PHR configuration timer to expire.

26. The wireless communications device of claim 14, wherein the wireless communications device is configured for one or more of a single carrier, a carrier aggregation, and a dual connectivity, operation, and wherein the wireless communications device is operative to transmit the second PHR to the first PLMN in a subframe occurring after a subframe where the second PLMN is activated.

27. A non-transitory computer readable medium including program code to be executed by processing circuitry of a wireless communications device, whereby execution of the program code causes the wireless communications device to perform operations comprising:
    transmitting first data to a first PLMN using a first Universal Subscriber Identity Module, USIM, of at least two USIMs and at least two uplink transmitters, UL Tx;
    transmitting a first power headroom report, PHR, to the first PLMN;
    transmitting second data to a second PLMN using a second USIM of the at least two USIMs and one of the at least two UL Tx; and
    in response to using the second USIM and the one of the at least two UL Tx to transmit the second data to the second PLMN, transmitting a second PHR to the first PLMN without waiting for an active PHR configuration timer to expire.

\* \* \* \* \*